United States Patent
Rui et al.

(10) Patent No.: US 7,428,315 B2
(45) Date of Patent: Sep. 23, 2008

(54) AUTOMATIC DETECTION AND TRACKING OF MULTIPLE INDIVIDUALS USING MULTIPLE CUES

(75) Inventors: Yong Rui, Sammamish, WA (US); Yunqiang Chen, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 11/042,766

(22) Filed: Jan. 25, 2005

(65) Prior Publication Data

US 2005/0210103 A1    Sep. 22, 2005

Related U.S. Application Data

(62) Division of application No. 10/006,927, filed on Dec. 3, 2001, now Pat. No. 7,130,446.

(51) Int. Cl.
G06K 9/00 (2006.01)
G06K 9/62 (2006.01)
G06K 9/68 (2006.01)
G06K 9/70 (2006.01)
G06K 9/74 (2006.01)

(52) U.S. Cl. .................. 382/103; 382/107; 382/118; 382/226; 382/228

(58) Field of Classification Search .................. 382/103, 382/107, 228, 118, 190–208, 240, 226; 715/863; 704/235, 270.1, 275; 348/169, 14.1
See application file for complete search history.

(56) References Cited

U.S. PATENT DOCUMENTS

| | | | |
|---|---|---|---|
| 4,951,140 A | 8/1990 | Ueno et al. | |
| 4,975,960 A | 12/1990 | Petajan | |
| 5,500,671 A | 3/1996 | Andersson et al. | |
| 5,805,733 A | 9/1998 | Wang et al. | |
| 6,148,092 A | 11/2000 | Qian | |
| 6,263,113 B1 | 7/2001 | Abdel-Mottaleb et al. | |
| 6,330,023 B1 | 12/2001 | Chen | |

(Continued)

FOREIGN PATENT DOCUMENTS

CN        1298601 A        6/2001

(Continued)

OTHER PUBLICATIONS

S. Birchfield, "Elliptical Head Tracking Using Intensity Gradients and Color Histograms", IEEE Conference on Computer Vision and Pattern Recognition, Santa Barbara, California, pp. 232-237, Jun. 1998.

(Continued)

Primary Examiner—Matthew C. Bella
Assistant Examiner—Wesley Tucker
(74) Attorney, Agent, or Firm—Lee & Hayes, PLLC

(57) ABSTRACT

Automatic detection and tracking of multiple individuals includes receiving a frame of video and/or audio content and identifying a candidate area for a new face region in the frame. One or more hierarchical verification levels are used to verify whether a human face is in the candidate area, and an indication made that the candidate area includes a face if the one or more hierarchical verification levels verify that a human face is in the candidate area. A plurality of audio and/or video cues are used to track each verified face in the video content from frame to frame.

6 Claims, 13 Drawing Sheets

U.S. PATENT DOCUMENTS

| | | | |
|---|---|---|---|
| 6,539,099 | B1 | 3/2003 | Kellner |
| 6,567,775 | B1* | 5/2003 | Maali et al. .................. 704/231 |
| 6,574,353 | B1 | 6/2003 | Schoepflin et al. |
| 6,593,956 | B1 | 7/2003 | Potts et al. |
| 6,754,373 | B1 | 6/2004 | de Cuetos et al. |
| 6,754,389 | B1 | 6/2004 | Dimitrova et al. |
| 6,766,042 | B2 | 7/2004 | Freeman et al. |
| 6,798,834 | B1 | 9/2004 | Murakami et al. |
| 6,816,836 | B2 | 11/2004 | Basu et al. |
| 2002/0176609 | A1 | 11/2002 | Hsieh et al. |

FOREIGN PATENT DOCUMENTS

| | | |
|---|---|---|
| DE | 19847261 | 4/2000 |
| EP | 0844582 | 5/1998 |
| EP | 1146743 | 10/2001 |
| JP | 09-293165 | 11/1997 |
| JP | 11-265455 | 9/1999 |
| JP | 2001-092974 | 4/2001 |
| JP | 2001-094857 | 4/2001 |
| JP | 2001-309225 | 11/2001 |
| WO | WO00/18128 | 3/2000 |
| WO | WO 0016243 | 3/2000 |
| WO | WO 0137222 | 5/2001 |
| WO | WO01/41064 | 6/2001 |
| WO | WO 0141064 | 6/2001 |

OTHER PUBLICATIONS

M. Brandstein, and H. Silverman, "A Practical Methodology for Speech Source Localization with Microphone Arrays", Computer, Speech, and Language, 39 pages, Nov. 1996.

M. Isard and A. Blake, "Condensation—conditional density propagation for visual tracking," International J. Computer Vision, 36 pages, 1998.

N. Jojic, M. Turk, and T. Huang, "Tracking Self-Occluding Articulated Objects on Dense Disparity Maps", IEEE International Conference on Computer Vision, Corfu, Greece, 8 pages, Sep. 1999.

S.Z. Li, Q.D. Fu, L. Gu, B. Scholkopf, Y.M. Cheng, H.J. Zhang, "Kernal Machine Based Learning for Multi-View Face Detection and Pose Estimation", in Proceedings of 8th IEEE International Conference on Computer Vision. Vancouver, Canada, 6 pages, Jul. 9-12, 2001.

S.Z. Li, Q.D. Fu, L. Gu, B. Scholkopf, Y.M. Cheng, H.J. Zhang, "Kernel Machine Based Learning for Multi-View Face Detection and Pose Estimation", Microsoft Research Technical Report MSR-TR-2001-07, 9 pages, Jan. 2001.

Y. Rui, A. Gupta, and J. Cadiz, "Viewing Meeting Captured by an Omni-Directional Camera", Microsoft Research Technical Report MSR-TR-2000-97, 10 pages, Sep. 2000.

J. Shi and C. Tomasi, "Good Features to Track", IEEE Conf. on Computer Vision and Pattern Recognition, pp. 593-600, 1994.

C. Stiller and J. Konrad, "Estimating Motion in Image Sequences, A tutorial on modeling and computation of 2D motion", IEEE Signal Processing Magazine, 34 pages, Jul. 1999.

H. Tao, H. Sawhney, and R. Kumar, "Dynamic Layer Representation with Applications to Tracking", in Proc. IEEE conf. on Computer vision and Pattern Recognition 2000 (CVPR 2000), vol. 2, pp. 134-141, Jun. 2000.

P. H. S. Torr, R. Szeliski, and P. Anandan, "An Integrated Bayesian Approach to Layer Extraction from Image Sequences", IEEE Seventh International Conference on Computer Vision, pp. 983-991, v.2, 1999.

N. Vasconcelos and A. Lippman, "Empirical Bayesian EM-based Motion Segmentation", Proc. Of IEEE conference on Computer Vision and Pattern Recognition, pp. 527-532, Puerto Rico, 1997.

P. Viola and M.J. Jones, "Robust Real-time Object Detection", Technical Report Series, Compaq Cambridge Research Laboratory, CXRL Jan. 2001, 29 pages, Feb. 2001.

P. Viola and M.J. Jones, "Robust Real-time Object Detection", 2nd International Workshop on Statistical and Computational Theories of Vision—Modeling, Learning, Computing, and Sampling, Vancouver, Canada, 25 pages, Jul. 2001.

H. Wang and P. Chu, "Voice Source Localization for Automatic Camera Pointing System in Videoconferencing", ICASSP '97 (1997 International Conference on Acoustics, Speech and Signal Processing), pp. 187-190, 1997.

C. Wren, A. Azarbayejani, T. Darrell, and A. Pentland, "Pfinder: Real-Time Tracking of the Human Body", IEEE Transactions on Pattern Analysis and Machine Intelligence, vol. 19, No. 7, pp. 780-785, Jul. 1997.

D. Comaniclu, V. Ramesh, and P. Meer, "Real-Time Tracking on Non-Rigid Objects using Mean Shift", IEEE Conf. Computer Vision and Pattern Recognition, vol. 2, pp. 142-149, 2000.

Kailath: "The Divergence and Bhattacharyya Distance Measures in Signal Selection," IEEE Transactions on Communications Technology; vol. Com-15, No. 1; Feb. 1967; pp. 52-61.

Cox, et al., "An Efficient Implementation of Reid's Multiple Hypothesis Tracking Algorithm and Its Evaluation for the Purpose of Visual Tracking", IEEE, 1996, vol. 19, No. 2, pp. 138-150.

Office Notice of Rejection of Japanese Patent Application No. 2002-351817 Mailed on Feb. 14, 2008, p. 32.

\* cited by examiner

US 7,428,315 B2

AUTOMATIC DETECTION AND TRACKING OF MULTIPLE INDIVIDUALS USING MULTIPLE CUES

RELATED APPLICATIONS

This application is a divisional of U.S. patent application Ser. No. 10/006,927, filed Dec. 3, 2001, entitled "Automatic Detection and Tracking of Multiple Individuals Using Multiple Cues", which is hereby incorporated by reference herein.

TECHNICAL FIELD

This invention relates to image and/or audio processing, and/or computer vision, and particularly to automatic detection and tracking of multiple individuals.

BACKGROUND

Systems that analyze video data are becoming increasingly popular. Video conferencing systems are examples of such systems—they allow for meetings to occur with visual interaction despite the fact that meeting participants may be located in different geographic locations. The visual aspect of video conferencing makes it typically more appealing than telephone conferences, while at the same time being a lower-cost alternative to (and typically can occur on shorter notice than) in-person meetings when one or more participants must travel to the meeting location.

Some current video conferencing systems use automated audio-based detection techniques and/or presets to move the camera (e.g., pan or tilt the camera). However, many problems exist with current video conferencing systems. One such problem is that the accuracy of audio-based speaker detection technique can be low. Additionally, the video conferencing system typically does not know how many participants there are in the meeting (including when participants join or leave the meeting), where the participants are located (sitting or standing), or which participant is currently talking. While some systems may be manually programmed with participant information (e.g., the number of participants and their locations), this requires user-entry of the information being programmed, which tends to restrict participants' ability to move about the room, as well as the ability of participants to join the conference.

The automatic detection and tracking of multiple individuals described herein helps solve these and other problems.

SUMMARY

Automatic detection and tracking of multiple individuals is described herein.

According to one aspect, a frame of content (e.g., audio and/or video) is received and one or more candidate areas for a new face region in the frame are identified. Hierarchical verification is then used to verify whether a human face is in the candidate area(s), and an indication made that the candidate area(s) includes a face if the hierarchical verification verifies that a human face is in the candidate area(s). After verification of the area(s), a plurality of cues are used to track each verified face in the content from frame to frame.

According to one aspect, there are three main modules in this detection and tracking framework: an automatic initialization module, a hierarchical verification module, and a multi-cue tracking module. A frame of content (e.g., audio and/or video) is received and one or more candidate areas for a new face (or other object) region in the frame are identified by the automatic initialization module. The hierarchical verification module is then used to verify whether a human face is in the candidate area(s), and an indication made that the candidate area includes a face if the hierarchical verification module verifies that a human face is in the candidate area(s). After the area(s) being verified, the multi-cue tracking module uses a plurality of cues to track each verified face in the content from frame to frame. During the whole tracking process, the tracked faces are continuously verified by the hierarchical verification module. If the confidence level is high, the multi-cue tracking module keeps track of the faces; if the confidence becomes low, tracking of that particular face is terminated. The tracking module and verification module wait for the initialization module to supply more candidates.

BRIEF DESCRIPTION OF THE DRAWINGS

The same numbers are used throughout the document to reference like components and/or features.

DETAILED DESCRIPTION

Automatic detection and tracking of multiple individuals is described herein. Video content and/or audio content is analyzed to automatically detect individuals in the frames of the content. Once detected, these individuals are automatically tracked in successive frames. In the event that tracking of an individual is lost, the individual is automatically detected again and tracking of the individual resumes.

Figure 1:
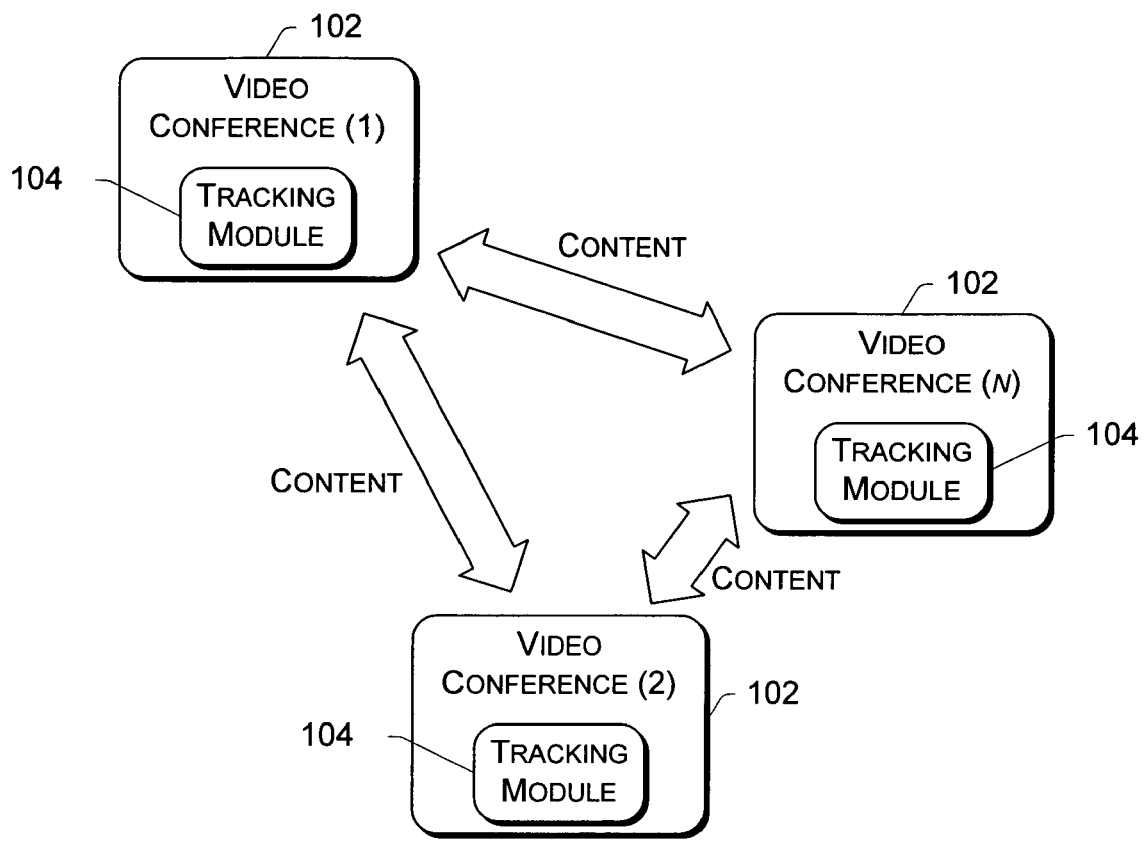
FIG. 1 illustrates an exemplary environment in which robust automated identification and tracking can be used.
Figure 2:
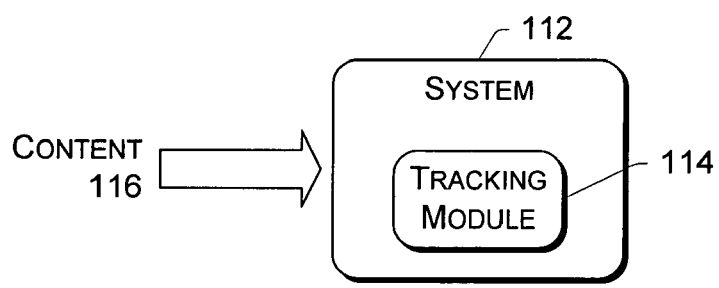
FIG. 2 illustrates another exemplary environment in which robust automated identification and tracking can be used.

FIGS. 1 and 2 illustrate exemplary environments in which robust automated detection and tracking can be used. In FIG.

1, multiple (n) video conferencing systems 102 are able to communicate audio/video content to one or more of each other, allowing conference participants located at each of the systems 102 to see and hear one another. A wide variety of different camera systems may be used with video conferencing systems 102, such as conventional pan/tilt/zoom cameras, 360-degree panorama cameras (e.g., which can pan/tilt/zoom digitally rather than mechanically), etc. One such 360-degree panorama camera system uses a camera pointed at a parabolic mirror device, and then uses various calibration techniques to de-warp the image to normal images from which a 360-degree omni-directional image about the camera can be constructed. An example of such a 360-degree panorama camera system can be found in co-pending U.S. patent application Ser. No. 09/681,843, entitled "Automated Online Broadcasting System and Method Using an Omni-Directional Camera System for Viewing Meetings Over a Computer Network", filed Jun. 14, 2001, by inventors Yong Rui, Anoop Gupta, Johnathan J. Cadiz, and Ross G. Cutler. Another such 360-degree panorama camera system uses multiple cameras (each having a less-than-360-degree field of view) arranged so that together they provide an approximately 360-degree field-of-view.

Each of conferencing systems 102 includes a tracking module 104 that robustly automatically detects and tracks multiple individuals at the corresponding system 102. This detection and tracking can be used for a variety of purposes, such as to tilt/pan/zoom the camera, highlight an individual (e.g., with an arrow pointing at or circle around the individual), etc.

Video conferencing systems 102 can be coupled together in any of a wide variety of manners. For example, one or more telephone lines (including digital lines, such as ISDN) may be used to couple together multiple ones of systems 102, either directly or via a central device or location, a conventional data network (e.g., the Internet, an intranet, etc.) may be used to couple together multiple ones of systems 102, and so forth.

In FIG. 2, a system 112 including a tracking module 114 receives content 116. Content 116 is typically audio/video content, but alternatively may include other types of content (e.g., shared whiteboard, etc.) and/or may not include audio content or video content. Tracking module 114 analyzes content 116 and robustly automatically detects and tracks multiple individuals based on their images and/or audio in content 116. Content 116 can be made available to system 112 in any of a variety of manners, such as a camera and microphone at system 112, a recording medium (e.g., magnetic tape, optical disk, etc.) on which the content is recorded, a telephone line or network input, etc.

Figure 3:
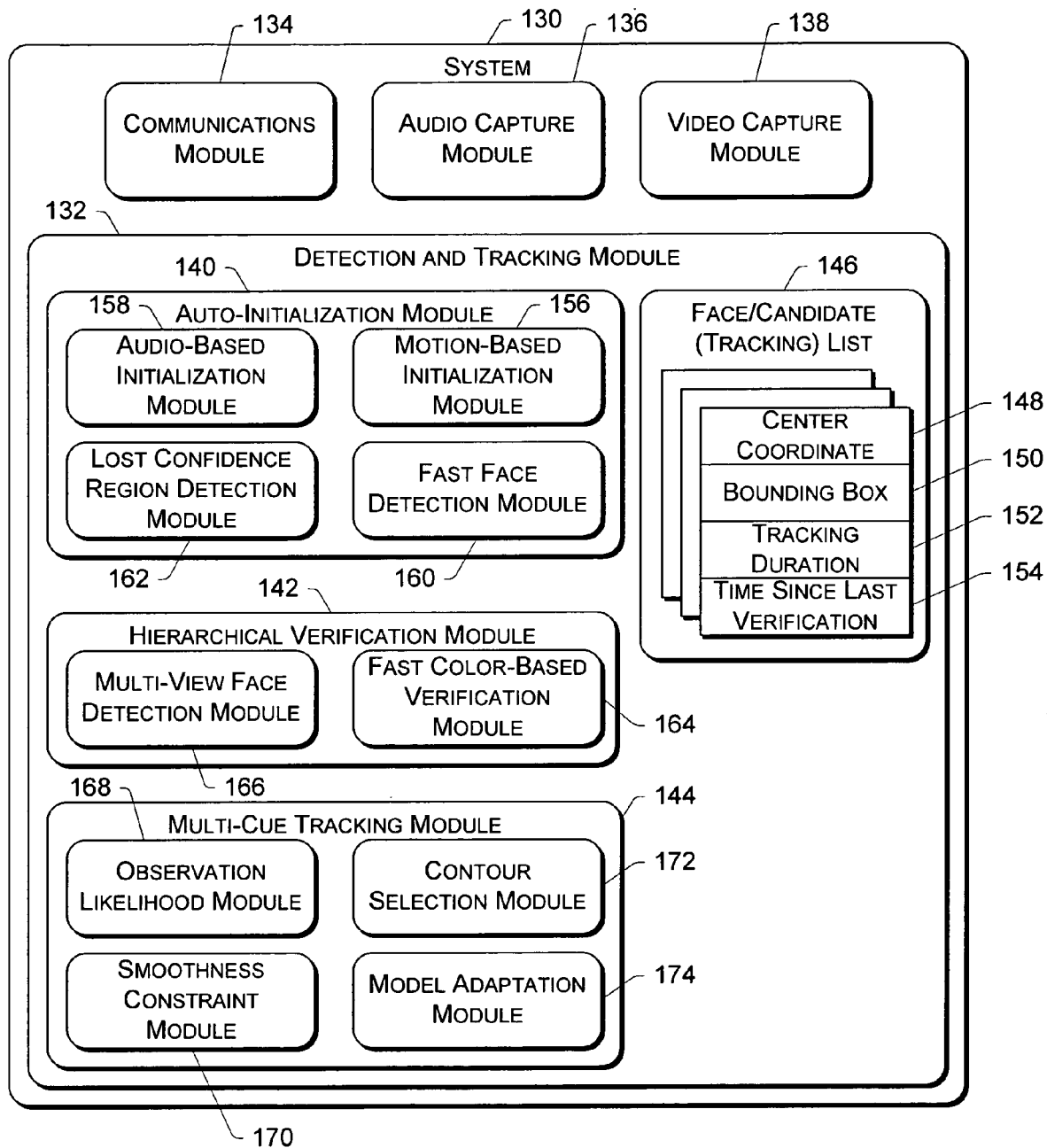
FIG. 3 illustrates an exemplary system using robust automated identification and tracking.

FIG. 3 illustrates an exemplary system 130 using robust automated detection and tracking. System 130 may be, for example, any of video conferencing systems 102 of FIG. 1 or a system 112 of FIG. 2. System 130 includes a detection and tracking module 132, a communications module 134, an audio capture module 136, and a video capture module 138. Various other modules (not shown) may also be included, such as a whiteboard capture module. Communications module 134 manages communications for system 130 with other systems, such as other video conferencing systems 102 of FIG. 1, or other devices from which content to be analyzed may be received. Communications module 134 can support a wide variety of conventional and/or proprietary protocols.

Audio capture module 136 manages the capturing of audio content at system 130, such as via one or more microphones (not shown) that are part of system 130. Further processing (e.g., using beamforming techniques) can also be done to enhance the audio quality. The audio content is converted to digital format (if necessary) and is made available to detection and tracking module 132 for tracking. Video capture module 138 manages the capturing of video content at system 130, such as via one or more video capture devices (e.g., analog or digital video cameras (not shown)) that are part of system 130 (which may include, for example, fixed cameras, conventional pan/tilt/zoom cameras, 360-degree panorama cameras, etc.). The captured frames of video content are then converted to digital format (if necessary) and are made available to detection and tracking module 132 for detection and tracking of individuals. The audio and video content are correlated with one another (e.g., at the time of capture), so for any particular portion of content (e.g., a frame) both the video and audio content are known. In alternate embodiments, one or more of modules 134, 136, and 138 may not be included. For example, a system may not include either a video capture module 138 or an audio capture module 136.

Detection and tracking module 132 includes an auto-initialization module 140, a hierarchical verification module 142, a multi-cue tracking module 144, and a face/candidate tracking list 146. Detection and tracking module 132 automatically detects regions of video content that include, or potentially include, human faces, and uses various cues to track the detected regions. These regions are also referred to herein as objects. Detection and tracking module 132 is capable of detecting multiple regions that include faces or face candidates and tracking these multiple regions concurrently.

Detection and tracking module 132 analyzes portions of content, such as frames. For example, video content is typically captured as a number of frames (e.g., still images) per second (typically on the order of 15-60 frames per second, although other rates may be used). These video frames, as well as the corresponding audio content (e.g., every $\frac{1}{15}$ to $\frac{1}{60}$ of a second of audio data) are used as the frame for detection and tracking by module 132. When recording audio, the audio is typically sampled at a much higher rate than the video (e.g., while 15 to 60 images may be captured each second for video, thousands of audio samples may be captured). The audio samples may correspond to a particular video frame in a variety of different manners. For example, the audio samples ranging from when a video frame is captured to when the next video frame is captured may be the audio frame corresponding to that video frame. By way of another example, the audio samples centered about the time of the video capture frame may be the audio frame corresponding to that video frame (e.g., if video is captured at 30 frames per second, the audio frame may range from $\frac{1}{60}$ of a second before the video frame is captured to $\frac{1}{60}$ of a second after the video frame is captured).

Additionally, in some situations there may be no video content. In these situations, frames of audio content can be generated from the sampled audio in any of a wide variety of manners. For example, the audio samples for every $\frac{1}{30}$ of a second or every $\frac{1}{60}$ of a second may constitute the frame of audio content.

In some situations the audio content may include data that does not directly correspond to the video content. For example, the audio content may be a soundtrack of music rather than the voices of people in the video content. In these situations, the detection and tracking described herein relies on the video content without the audio content.

Although discussed herein primarily with reference to using video and audio content, detection and tracking module 132 may alternatively operate based on only video content or only audio content. In situations where there is no audio content, the processes discussed below for processing audio content are not performed. Similarly, in situations where there is no video content, the processes discussed below for processing video content are not performed.

Face/candidate tracking list 146 maintains information for each detected region that includes, or potentially includes, a human face. Those regions that potentially include a face but for which the presence of a face has not been verified are referred to as candidate regions. In the illustrated example, each region is described by a center coordinate 148, a bounding box 150, a tracking duration 152, and a time since last verification 154. The regions of video content that include faces or face candidates are defined by a center coordinate and a bounding box. Center coordinate 148 represents the approximate center of the region, while bounding box 150 represents a rectangular region around the center coordinate. This rectangular region is the region that includes a face or face candidate and is tracked by detection and tracking module 132. Tracking duration 152 represents how long the face or face candidate in the region has been tracked, while the time since last verification 154 represents how long ago the face or face candidate in the region was verified (by verification module 142, as discussed in more detail below).

The information describing each region as illustrated in list 146 is exemplary only and various other information may alternatively be used. For example, center coordinate 148 may not be included. By way of another example, a region shape other than rectangular may be used, such as a circle, ellipse, triangle, pentagon, hexagon, or free-form shapes.

Tracking list 146 records both faces and face candidates, which can be distinguished from each other in a variety of manners. For example, two sub-lists (one identifying faces and the other identifying face candidates) may be maintained, or an additional field may be added to label each field as either a face or a face candidate, or it may be inherent in the time since last verification 154 (e.g., if this is value is blank it means that the region has not yet been verified as including a face and thus is a face candidate). Alternatively, multiple lists may be included rather than the single list 146 (e.g., one list for faces and another list for face candidates).

During operation, detection and tracking module 132 analyzes content on a frame by frame basis. For each frame, module 132 activates the auto-initialization module 140 which operates to detect candidates for new face regions. Each such candidate is a region of the video content that potentially includes a new face (that is, a face that is not currently being tracked). Once detected, a candidate region is passed to hierarchical verification module 142, which in turn verifies whether the candidate region does indeed include a face. Hierarchical verification module 142 generates a confidence level for each candidate and determines to keep the candidate as a face region if the confidence level exceeds a threshold value, adding a description of the region to tracking list 146. If the confidence level does not exceed the threshold value, then hierarchical verification module 142 discards the candidate.

Multi-cue tracking module 144 tracks each of the regions identified in tracking list 146. Tracking module 144 uses various visual cues to track regions from frame to frame in the content. Each of the faces in a region being tracked is an image of at least a portion of a person. Typically, people are able to move while the content is being generated, such as to stand up, sit down, walk around, move while seated in their chair, and so forth. Rather than performing face detection in each frame of the content, module 132 tracks regions that include faces (once detected) from frame to frame, which is typically less computationally expensive than face detection.

In addition to being tracked, each region including a face from tracking list 146 is repeatedly re-verified by hierarchical verification module 142. Multi-cue tracking module 144, or alternatively hierarchical verification module 142, may determine when a region is to be re-verified by module 142. Regions may be re-verified at regular or irregular intervals. When re-verifying a region, hierarchical verification module 142 generates a new confidence level for the region and compares the confidence level to the threshold value. If the new confidence level exceeds the threshold value, then the time since last verification 154 for the region is reset and the region is left in tracking list 146. However, if the new confidence level does not exceed the threshold value, then the region is deleted from tracking list 146.

It should be noted that situations can arise where multi-cue tracking module 144 loses its tracking. Hierarchical verification module 142 resolves these situations by identifying when tracking of a region including a face has been lost (e.g., a confidence level for the region is low). This allows auto-initialization module 140 to re-detect the region and tracking of the re-detected region to proceed.

Auto-Initialization

Auto-initialization module 140 uses one or more techniques to detect candidates for new face regions. These techniques include motion-based initialization, audio-based sound source location, and fast face detection. A motion-based initialization module 156 detects motion using the inter-frame difference (the difference between two or more frames of the video content) and determines whether the areas in which motion is detected include a face. An audio-based initialization module 158 analyzes the audio content corresponding to the video content, detects a direction from which sound is received, and searches the region of the video content in that direction to determine whether a region(s) in the direction from which sound is received includes a face. Modules 156 and 158 both operate to analyze each frame of video content. Alternatively, one of the modules 156 and 158 may operate on a particular frame of video content only if the other module 156 or 158 fails to detect any faces.

Fast face detection module 160 operates when there is no motion or audio in the frame of the video content. Alternatively, module 160 may operate when there is motion and/or audio in the frame, but when neither module 156 nor module 158 detects a face (or alternatively regardless of whether module 156 or 158 detects a face). Fast face detection module 160 uses a fast face detector to analyze the frame of the video content and detect faces in the frame. Lost confidence region detection module 162 operates when auto-initialization module 140 is notified that re-verification of a region has resulted in a loss in confidence that the region includes a face. Even though confidence that a region includes a face has been lost, it is still likely that a face is near this region. Lost confidence region detection module 162 communicates with each of modules 156, 158, and 160 to have the modules 156, 158, and 160 analyze the area of the video content around this region to attempt to detect a face in the area. The exact size of the area around the region can vary by implementation (e.g., in one exemplary implementation the area may extend above and below the region by one-half the height of the region, and extend to the left and right of the region by one-half the width of the region.

Figure 4:
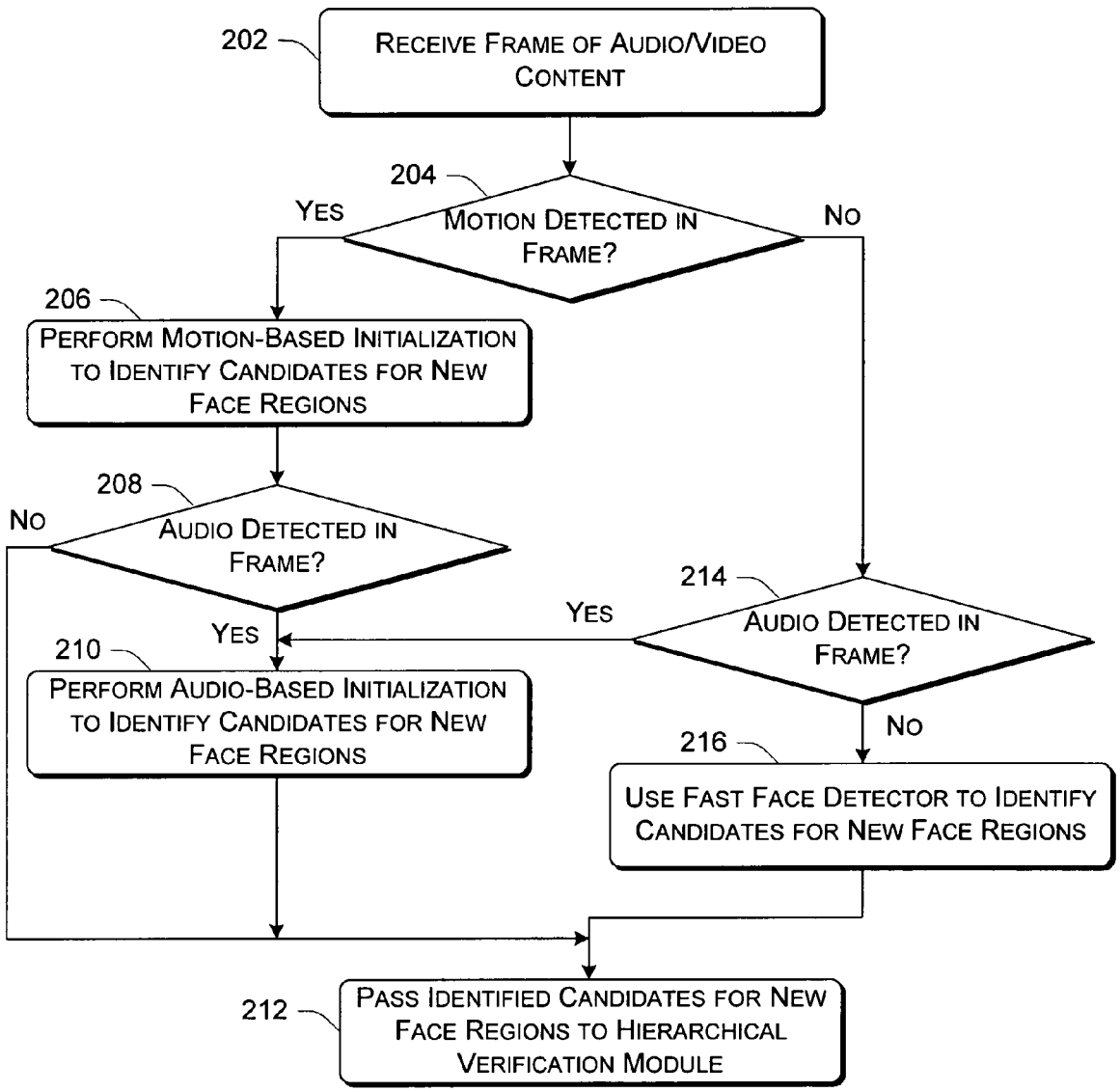
FIG. 4 is a flowchart illustrating an exemplary process for detecting candidates for new face regions.

FIG. 4 is a flowchart illustrating an exemplary process 200 for detecting candidates for new face regions. The process of FIG. 4 is carried out by auto-initialization module 140 of FIG. 3, and may be performed in software.

Initially, a frame of audio/video content is received (202). This frame of content can be received from any of a wide variety of sources. For example, the frame of content may be captured by one or more capture devices of system 130 of FIG. 3, or the content may be captured elsewhere and communicated to system 130 (e.g., via a removable storage device, via a network or telephone line connection, etc.). Once received, an attempt to detect motion in the frame is made by comparing pixels of the frame to corresponding pixels of the previous frame in the audio/video content (act 204). If motion is detected, then motion-based initialization is performed to identify candidates for new face regions in the frame (act 206). After any candidates for new face regions using motion-based initialization are identified in act 206 an attempt is made to detect audio in the frame (act 208). If audio is detected, then audio-based initialization is performed to identify candidates for new face regions in the frame (act 210). Any identified candidates for new face regions based on the motion-based initialization and/or the audio-based initialization are passed to the hierarchical verification module 142 for face verification (act 212).

Returning to act 204, if no motion is detected in the frame then an attempt is made to detect audio in the frame (act 214). If audio is detected, then audio-based initialization is performed to identify candidates for new face regions in the frame (act 210), and processing proceeds to act 212. However, if no audio is detected, then a fast face detector is used to identify candidates for new face regions (act 216). Any identified candidates for new face regions based on a fast face detection are passed to the hierarchical verification module 142 for face verification (act 212).

The area of the frame in which attempts are made to detect motion or audio, or in which the fast face detector is used, can vary based on the situation. In the situation where tracking list 146 includes no faces or face candidates, then the area of the frame is the entire frame. In situations where tracking list 146 includes one or more faces or face candidates, then the area of the frame includes all those areas that are not currently being tracked (that is, are not listed in tracking list 146). In situations where lost confidence region detection module 162 requests that a particular area be analyzed, then the area of the frame is that area identified by module 162.

Returning to FIG. 3, motion-based initialization module 156 analyzes a frame of video content by comparing pixels in the frame to the corresponding pixels in the previous frame(s) and/or subsequent frame(s) and detects whether there is motion between/among the frames at each pixel. A moving individual is deemed to be in the foreground of the video content, and module 156 attempts to identify the shape of this moving foreground. If the shape is similar to a human upper body silhouette (a smaller head on top of a larger shoulder), then the shape is determined to be a face candidate.

Figure 5:
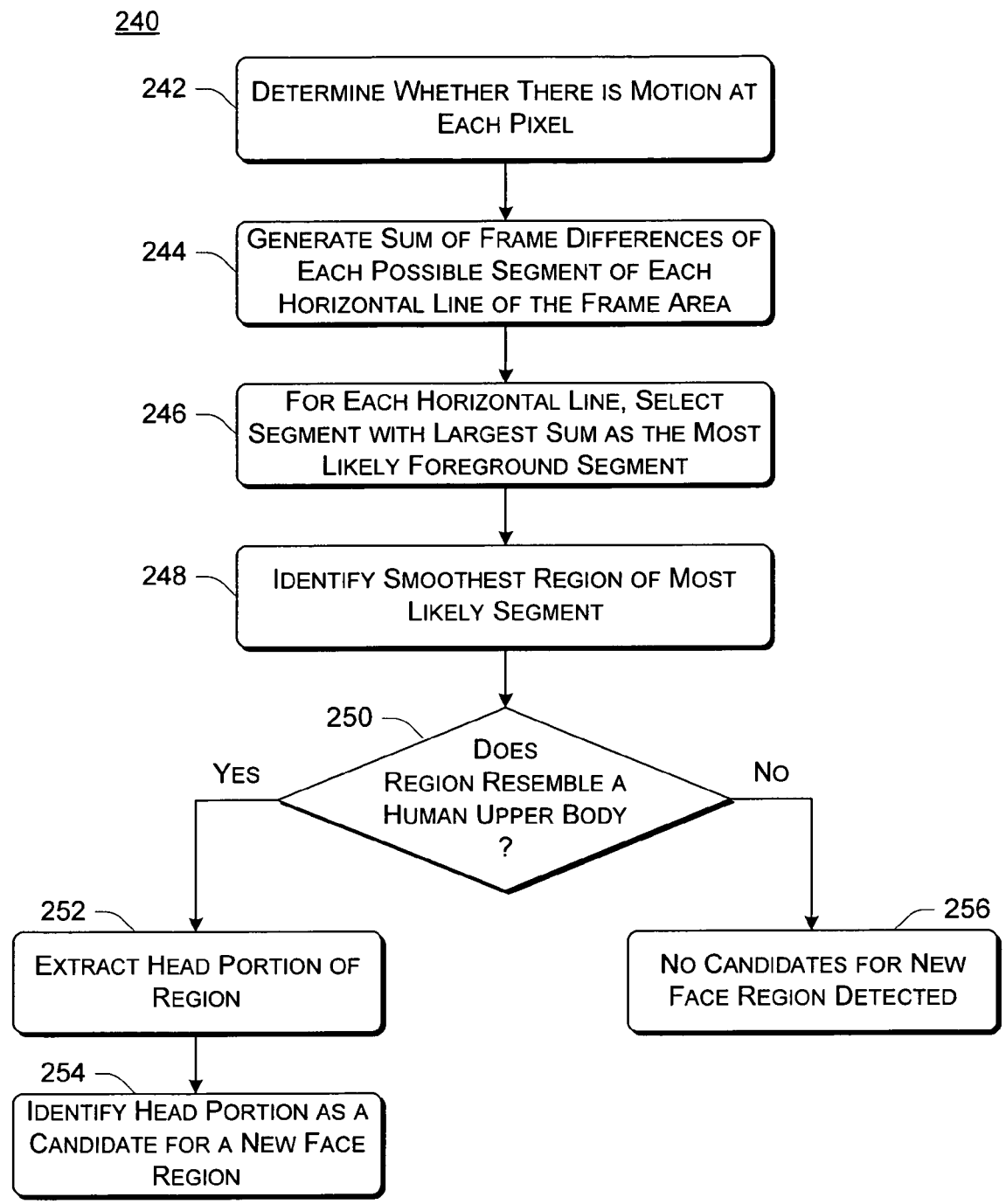
FIG. 5 is a flowchart illustrating an exemplary process for identifying candidates for new face regions using motion-based initialization.

FIG. 5 is a flowchart illustrating an exemplary process 240 for identifying candidates for new face regions using motion-based initialization. The process of FIG. 5 is carried out by motion-based initialization module 156 of FIG. 3, and may be performed in software.

Initially, a determination is made as to whether there is motion at each pixel (act 242). This determination is made for each pixel of a frame by comparing the pixel to the corresponding pixel of the previous frame. The comparison can be made by, for example pixel intensity (e.g., gray level) or color values. Various conventional filters may also be applied to the pixels before being compared. The video content can be viewed using a conventional 2-dimensional (x,y) coordinate system of pixels. A pixel in one frame at a particular coordinate location corresponds to a pixel in another frame that is at that same coordinate location. Each pixel in the area of the frame being analyzed has a frame difference generated as follows:

$$D_t(x, y) = \begin{cases} 1, & I_t(x, y) - I_{t-1}(x, y) > d_{th} \\ 0, & \text{otherwise} \end{cases}$$

where $D_t(xy)$ is the frame difference between the pixel at location (x,y) in the image at frame t and the pixel at location (x,y) in the image at frame t−1, $I_t(x,y)$ is the pixel at location (x,y) in the image at frame t, $I_{t-1}(x,y)$ is the pixel at location (x,y) in the image at frame t−1, and $d_{th}$ is the threshold to decide if a pixel is a motion pixel. The exact value of $d_{th}$ can vary by implementation, such as based on whether the frames are color or gray scale, what (if any) filtering has been done, etc. As one particular example, a value of 20 could be used for $d_{th}$ if the pixels are 256-level gray scale.

Alternatively, the frame difference may be generated based on three or more frames rather than just two frames. In one implementation, three frames (e.g., $I_{t-1}$, $I_t$, $I_{t+1}$) are used to detect moving pixels. Only the pixels that have a large frame difference (e.g., greater than $d_{th}$) in both $I_t(x,y)-I_{t-1}(x,y)$ and $I_{t+1}(x,y)-I_t(x,y)$ are the moving pixels.

Given the frame differences, the sum of the frame differences of each possible segment of each horizontal line of the image in the frame area being analyzed is generated (act 244). The image in the frame area being analyzed includes multiple horizontal lines. Each horizontal row of pixels may be such a line, or alternatively every $n^{th}$ (e.g., second, third, fourth, fifth, etc.) horizontal row of pixels may be such a line. Numerous segments of each such line exist, having different beginning and ending points on the line. The sum of the frame differences along the possible segments is used to attempt to identify the most likely foreground segment in the area being analyzed. This is illustrated in additional detail in FIG. 6.

Figure 6:
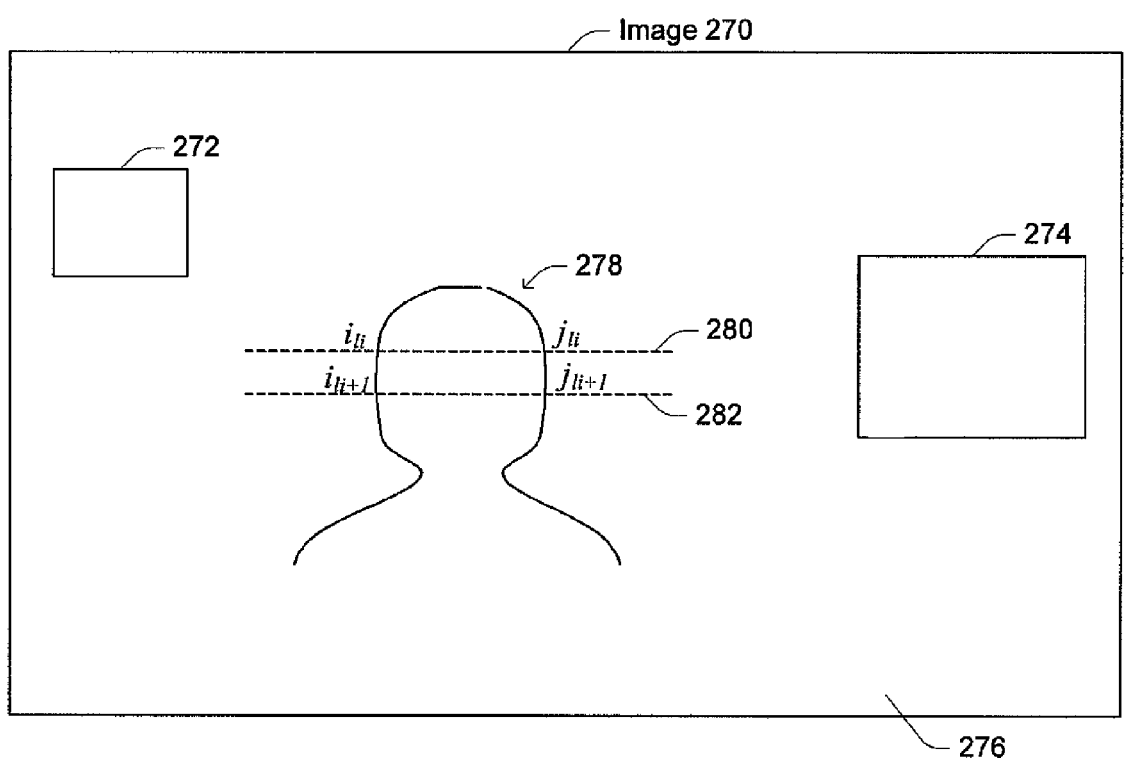
FIG. 6 illustrates an exemplary image for a frame of video content.

FIG. 6 illustrates an exemplary image for a frame of video content. An image 270 is illustrated including two regions 272 and 274 being already tracked as containing faces or face candidates, and the remaining area 276 being analyzed for candidates for new face regions. Assuming that the image includes an individual 278, two horizontal lines 280 and 282 will intersect image 278 at beginning points i and ending points j. All of the pixels between points i and j on a particular line li should be on the foreground, and the boundaries between two consecutive horizontal lines should also have a smoothness constraint—they tend to have a similar center and similar width. The frame difference sums are used to identify the portions of the horizontal lines li with beginning points i and ending points j.

For each horizontal line, the sum S of the frame difference of each possible segment on the horizontal line is generated as follows:

$$S(i, j) = \sum_{x=i}^{j} D(x, y) \quad 0 < i < j < N, y \in [0, M]$$

where i is the starting point of the segment, j is the ending point of the segment, D(x,y) is the frame difference at location x,y along the segment, N is the length of the horizontal line, and M is the number of horizontal lines.

In order to increase the speed at which the sum for all possible i and j can be calculated, the following process is used. First, for every value i that is between zero and N, inclusive, the following is generated:

$$S(i,i) = D(i,y), i \in [0,N]$$

Then, compute from k=1 to k=N, $$S(i,i+k) = S(i,i+k-1) + S(i+k,i+k), i \in [0,N-k]$$

Returning to FIG. 5, once the sum of the frame difference for each possible segment on the horizontal lines are generated, for each horizontal line the segment with the largest sum is selected as the most likely foreground segment on that line (act 246). Whether the segment with the largest sum is actually part of a candidate for a new face region also depends on smoothness constraints, as discussed below. The smoothest region of most likely segments is then determined (act 248). The smoothest region is generated by considering the smoothness constraint across all the horizontal lines. This is achieved as follows. The process begins with y=0 (the top horizontal line) with $E^o(i^{(0)}, j^{(0)}) = S(i^{(0)}, j^{(0)})$ and propagates to y=M (the bottom horizontal line) by the following recursive function:

$$E^o(i^{(y)}, j^{(y)}) = S(i^{(y)}, j^{(y)}) + \max_{i^{(y-1)}, j^{(y-1)} \in [0,N]} \left( E^o(i^{(y-1)}, j^{(y-1)}) + C\left( \begin{bmatrix} i^{(y-1)} \\ j^{(y-1)} \end{bmatrix}, \begin{bmatrix} i^{(y)} \\ j^{(y)} \end{bmatrix} \right) \right)$$

where $i^{(y)}$ and $j^{(y)}$ are the boundaries on (y)th horizontal line, and N is the width of the image. The C(.,.) parameter is the smoothness energy term. The C(.,.) parameter gives a large penalty to non-smooth boundaries between successive lines, and is defined as follows:

$$C\left( \begin{bmatrix} i^{(y-1)} \\ j^{(y-1)} \end{bmatrix}, \begin{bmatrix} i^{(y)} \\ j^{(y)} \end{bmatrix} \right) = c_c \cdot \left| \frac{i^{(y)} + j^{(y)}}{2} - \frac{i^{(y-1)} + j^{(y-1)}}{2} \right| + c_w \cdot |(j^{(y)} - i^{(y)}) - (j^{(y-1)} - i^{(y-1)})|$$

where $c_c$ is the penalty coefficient for non-smoothness of the segment center while a $c_w$ is the penalty coefficient for non-smoothness of the segment width. Different values for the penalty coefficients $c_c$ and $c_w$ can be used, and in one exemplary implementation each of the $c_c$ and $c_w$ values is 0.5.

The smoothest region can then be obtained by determining:

$$\max_{i^{(M)}, j^{(M)} \in [0,N]} (E^o(i^{(M)}, j^{(M)}))$$

Given this smoothest region, a back trace to find the boundaries on all horizontal lines can be performed.

Given the smoothest region, a check is made as to whether the region resembles a human upper body (act 250). In the illustrated example, the human upper body includes a smaller head on top of a larger shoulder. So, a check is made as to whether the smoothest region has an approximately elliptical portion (the head) located above a wider portion (the shoulder). In one implementation, this check is made by first detecting the position of the neck by finding the largest change of the width on neighboring horizontal lines. Then, a check is made as to whether the region above the neck (the head region) has a smaller average width than the lower region (the shoulder region). A check is also made as to whether the width to height ratio of the head region is approximately 1:1.2. If all of these checks are true, then the detected region is determined to resemble a human upper body silhouette.

If the region does resemble a human upper body, then the portion of the region including the head (but excluding the shoulders) is extracted (act 252) and identified as a candidate for a new face region (act 254). This extracted region may be the approximately elliptical region of the human head or an area around the head (e.g., a rectangular region about the head). However, if the region does not resemble a human upper body, then no candidates for a new face region are detected from the frame (act 256).

In one implementation, the process of FIG. 5 is repeated if a candidate for a new face region is identified in act 254 and if there are any additional regions in the frame (not counting the candidate identified in act 254 or any other faces or face candidates). This allows additional candidates for new face regions to be identified in the frame.

Returning to FIGS. 3 and 4, audio-based initialization module 158 analyzes a frame of audio/video content (act 210 of FIG. 4) by using a sound source locator to detect a direction from which sound is received. Module 158 assumes that this sound may be human speech, and thus is indicative of a region of the video content that may include a candidate for a face region. The direction from which sound is received can be determined in a wide variety of different manners. In one implementation, one or more microphone arrays capture sound and one or more sound source localization algorithms are used to determine which direction the sound came from. A variety of different conventional sound source localization algorithms can be used, such as well-known time-delay-of-arrival (TDOA) techniques (e.g., the generalized cross-correlation (GCC) approach).

In situations where there is no video content, face detection can be accomplished by proper placement of multiple microphones. Using three or more microphones, at least two of which are located on different horizontal planes and at least two of which are located on different vertical planes, an (x,y) coordinate can be determined for the sound source. For example, two microphones may be located in the vertical plane and two microphones may be located in the horizontal plane. Any of a variety of conventional sound source localization algorithms can then be used to determine an (x,y) location of the sound source, which is presumed to be an individual's mouth. This sound source location itself can be treated as the detected face region (given that the speaker's mouth is part of the speaker's face), or alternatively the location may be expanded (e.g., increased by two or three percent) and the expanded location used as the detected face region.

Given an area of the image that corresponds to the direction from which sound is received, initialization module 158 analyzes that area and attempts to fit a skin color model to the image in that area. If this attempt is successful, then the area to which the skin color model is fit is identified as a candidate for a new face region. In one implementation, the skin color model is a HSV (Hue-Saturation-Value) color space model, with numerous skin color training data being used to train the model). It should be noted that, because the audio already indicates that there is a face in the region, a coarse detection process (e.g., a skin color model) can be used to locate the face.

In situations where no video content is available, module 158 relies on the sound source location determination without use of the skin color model (as there is no video content to which the skin color model can be applied).

Fast face detection module 160 uses a fast face detector to detect a face(s) with the areas of the image of the frame. The fast face detector used by detection module 160 can be different than the face detector used by hierarchical verification module 142 as discussed in more detail below. For computation and accuracy tradeoffs, the face detector used by module 160 is faster, but less accurate, than the face detector used by hierarchical verification module 142; however, modules 160 and 142 may be based on the same face detection algorithm, but use different parameters or thresholds in order to increase the speed of detection by module 160 relative to the speed of detection by module 142. Alternatively, modules 160 and 142 may be based on two different face detection algorithms. The detector used by detection module 160 is typically faster than the detector used by hierarchical verification module 142.

A wide variety of face detection algorithms can be used as the basis for fast face detection module 160, with a primary characteristic of the algorithm(s) used being its (their) speed. The goal of fast face detection module 160 is to detect faces quickly, at the expense of accuracy if necessary. The face detection may be frontal-face only, or alternatively may be multi-view (and not limited to frontal-face detection). An example of such an algorithm is described in P. Viola and M. J. Jones, "Robust real-time object detection", Technical Report Series, Compaq Cambridge Research laboratory, CXRL 2001/01, February 2001. Another example of such an algorithm is similar to that discussed in P. Viola and M. J. Jones, except that stages of detectors are used starting with a detector that covers a wide range of degrees of view, and advancing to a set of multiple detectors each covering a narrower range of degrees of view. Objects are passed from one stage of detectors to another, with each detector classifying the object as either a face or a non-face. As soon as an object is classified as a non-face by any detector it is dropped from the process—only those objects that pass through and are classified by all stages of detectors as faces are identified as faces.

Thus, using one or more of the motion-based initialization, audio-based sound source location, and fast detection techniques, auto-initialization module 140 detects candidates for new face regions. These candidates are then passed to hierarchical verification module 142 for verification as to whether the candidates actually include a face. It should be noted that not all frames will include new faces, and thus auto-initialization module 140 may not detect any candidates for new face regions in a frame even if using all of the above-referenced techniques.

Hierarchical Verification

Hierarchical verification module 142 of FIG. 3 verifies candidate face regions identified by auto-initialization module 140. Additionally, detection and us tracking module 132 accounts for the possibility that multi-cue tracking module 144 may lose track of objects during operation. This may occur for a variety of reasons, such as occlusions (e.g., when another participant walks between the video capture device and the individual being tracked) or sudden lighting changes. Hierarchical verification module 142 re-verifies, at regular or irregular intervals, each object being tracked and downgrades objects from faces to face candidates as appropriate. The length of the intervals can vary, based on how accurate the tracking is desired to be (shorter intervals tend to improve the accuracy), the amount of computing power available (depending on the type of verifying, the tracking may take less computing power than re-verifying), and the computational expense of the verification module(s).

In one implementation, hierarchical verification module 142 verifies objects as faces and identifies an object as either a face or not a face. Alternatively, verification module 142 may also output probabilistic verification results based on different features (e.g., audio, color histogram distance, edge detection results around the boundary, face detection results, etc.). In so doing, the output probabilistic verification results can be combined with the weighting scheme of particle-filtering discussed in more detail below.

Because of computation considerations, hierarchical verification module 142 uses a multilevel hierarchical process to verify an object includes a face. The verification process is a coarse to fine process starting with faster, but less It accurate, verification and rising to slower, but more accurate, verification if needed. In the illustrated example, the hierarchical process includes two levels. Alternatively, three or more levels may be included in the hierarchical process.

Hierarchical verification module 142 of FIG. 3 includes a fast color-based verification module 164, and a multi-view face detection module 166. Verification module 142 assumes that an object typically does not change color significantly during successive frames. Color-based verification module 164 verifies objects based on the similarity between the color histogram of the object in the current frame and the estimated color histogram of the object in the previous frames. When the similarity is high, it is assumed that no loss of tracking has occurred and multi-view face detection module 166 need not be invoked. However, when the similarity is low a loss of tracking may have occurred, so the object is downgraded from a face to a face candidate and passed to multi-view face detection module 166. If the multi-view face detection module 166 verifies the object as a face, the object is upgraded from face candidate to face. However, if detection module 166 does not verify the object as a face, the object is deleted from tracking list 146.

In one implementation, color-based verification module 164 performs its verification for each frame, while multi-view face detection module 166 performs its verification less frequently. As an example, multi-view face detection module 166 may perform its verification once every few seconds, although different intervals may also be used based on the various factors discussed above.

Figure 7:
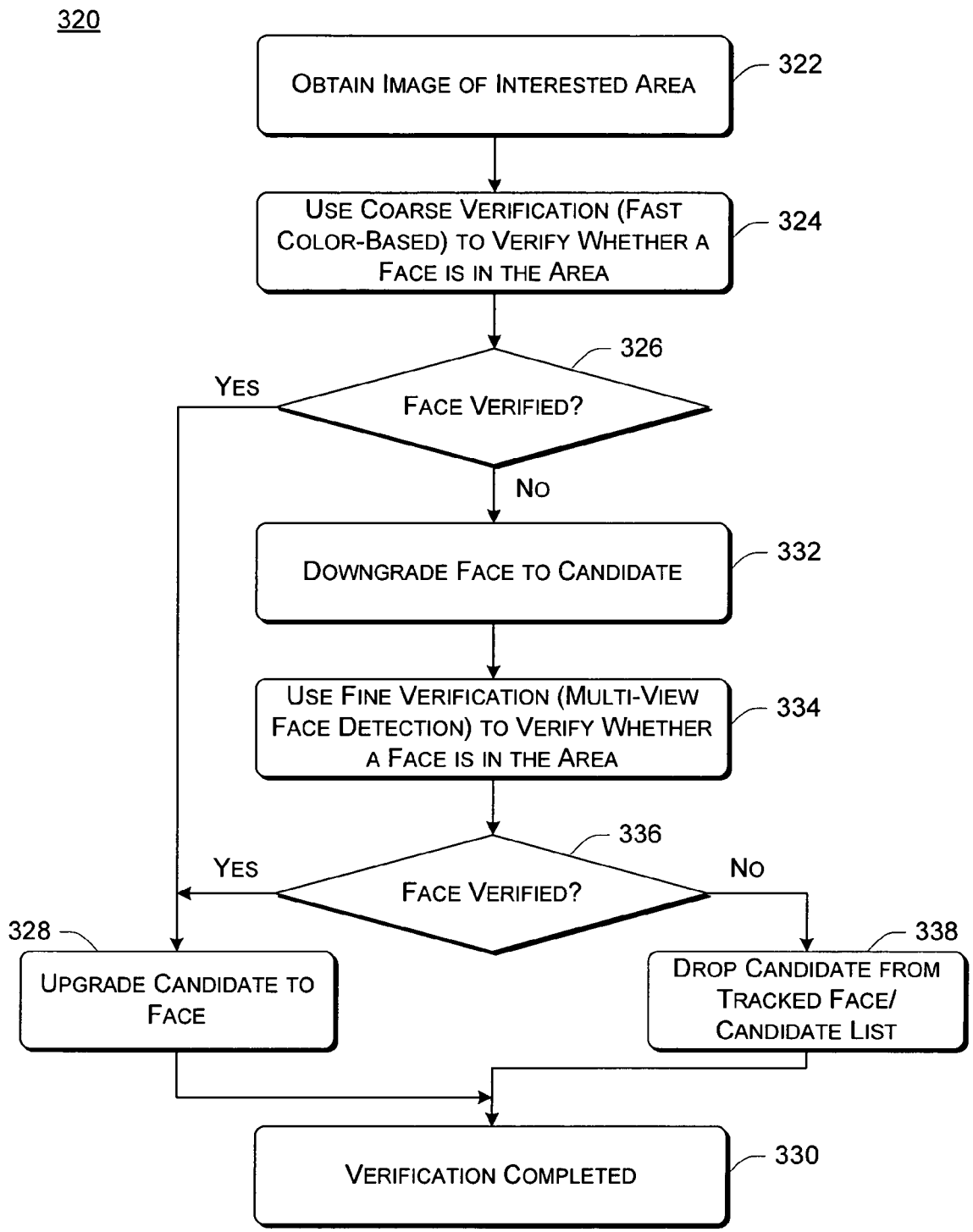
FIG. 7 is a flowchart illustrating an exemplary process for performing hierarchical verification.

FIG. 7 is a flowchart illustrating an exemplary process 320 for performing hierarchical verification. Process 320 is performed by hierarchical verification module 142 of FIG. 3, and may be performed in software.

Initially, an image of the interested area is obtained (act 322). The interested area may be a candidate region, identified by auto-initialization module 140, or a region for re-verification. Hierarchical verification module 142 may be passed the entire frame with an indication of the area to be analyzed, or alternatively only the portion of the frame that includes the area to be analyzed. Once received, a fast color-based verification is used to verify whether a face is in the area (act 324).

Figure 8:
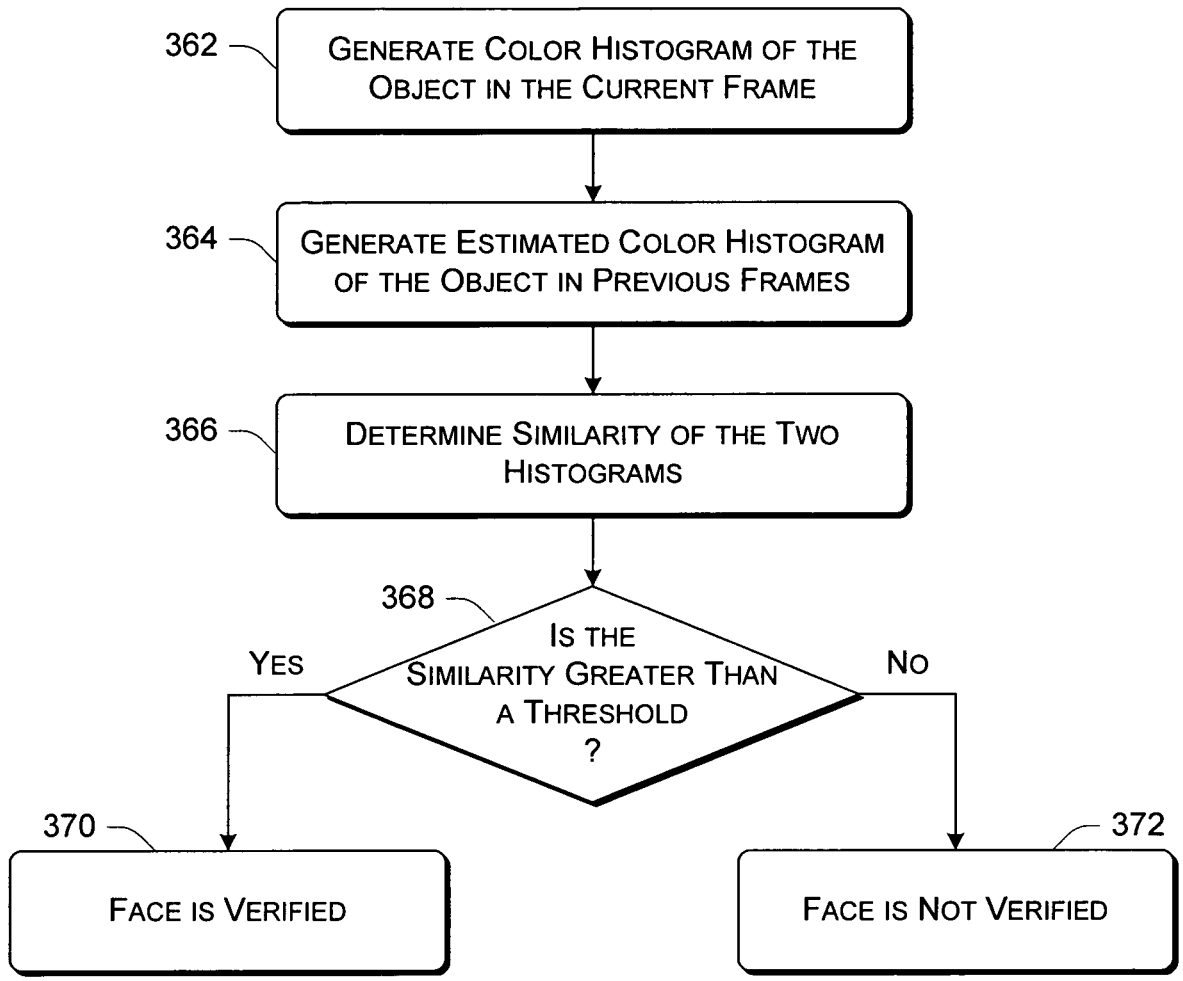
FIG. 8 illustrates an exemplary process for fast color-based verification.

The fast color-based verification of act 324 is illustrated in additional detail with reference to FIG. 8. The process 324 of FIG. 8 is performed by fast color-based verification module 164 of FIG. 3, and may be performed in software. Initially, a color histogram ($q_t(x)$) of the object in the current frame t is generated (act 362). An estimated color histogram ($p_{t-1}(x)$) of the object in previous frames is also generated (act 364). The estimated color histogram $p_{t-1}(x)$ is generated as follows:

$$p_{t-1}(x) = \alpha \cdot q_{t-1}(x) + (1-\alpha) \cdot p_{t-2}(x)$$

where α represents a weight, $q_{t-1}(x)$ is the color histogram of the object in the previous frame t−1, and $p_{t-2}(x)$ is the estimated color histogram generated for the object in the previous frame t−1. A wide range of values for a can be used in different implementations, the exact value being selected as a tradeoff between trust of the history and trust of the current frame (e.g., in one exemplary implementation, the value of a can range from 0.25 to 0.75). The estimated color histogram $p_{t-1}(x)$ for the object is thus updated based on the color histogram of the object in each frame.

The similarity of the two histograms is then determined (act 366). To determine the similarity measure of the two histograms $q_t(x)$ and $p_{t-1}(x)$, the well-known Bhattacharyya Coefficient is used as follows:

$$\rho(p_{t-1}(x), q_t(x)) = \int \sqrt{p_{t-1}(x) \cdot q_t(x)} dx$$

where ρ represents the probability of classification error in statistical hypotheses testing—the larger the probability of error, the more similar the two distributions is are. The value of ρ ranges from zero to one, with one meaning the two histograms are the same and zero meaning the two histograms are totally different. This similarity measure is also referred to herein as a confidence level. Alternatively, other well-known similarity measures may be used, such as K-L divergence, histogram intersection, and so forth.

A check is then made as to whether the similarity between the two histograms exceeds a threshold amount (act 368). If the difference is greater than the threshold amount then the face is verified (act 370); that is, the object is verified as including a face. However, if the difference is not greater than the threshold amount then the face is not verified (act 372); that is, the object is not verified as including a face. Different thresholds can be used in different implementations. In one exemplary implementation, the threshold value can range from 0.90 to 0.95, and in one particular implementation is 0.94.

Returning to FIG. 7, processing proceeds based on whether the face is verified (act 326). If the face is verified, then it is upgraded from a face candidate to a face (if not already a face) (act 328), and the hierarchical verification process is completed (act 330) and no more verification is performed for the interested area at this time. However, if the face is not verified, then the face is downgraded from a face to a face candidate (if currently a face) (act 332). The object including the face is then passed to multi-view face detection module 166 of FIG. 3, which uses multi-view face detection to verify whether a face is in the area (act 334).

Multi-view face detection module 166 uses one or more detection processes that attempt to detect human faces in different poses or from multiple views (that is, to detect the faces even though the head may be tilted, rotated away from the image capturing device, etc.). Any of a wide variety of face detection techniques can be used by multi-view face detection module 166.

One such multi-view face detection process is a kernel machine based process, discussed in additional detail in S. Z. Li, Q. D. Fu, L. Gu, B. Scholkopf, Y. M. Cheng, H. J. Zhang., "Kernel Machine Based learning for Multi-View Face Detection and Pose Estimation," *Proceedings of 8th IEEE International Conference on Computer Vision*, Vancouver, Canada, Jul. 9-12, 2001. A summary of this detection process follows.

Let $Ip \in \Re^N$ be a windowed grey-level image or appearance of a face. Assume that all left rotated faces (those with view angles between 91° and 180°) are mirrored to right rotates so that every view angle is between 0° and 90°. Quantize the pose into a set of L discrete values (e.g., choose L=10 for 10 equally spaced angles 0° to 90°, with 0° corresponding to the right side view and 90° to the frontal view).

Assume that a set of training face images are provided for the learning. The images Ip are subject to changes not only in the view, but also in illumination. The training set is view-labeled in that each face image is manually labeled with its view value as close to the truth as possible, and then assigned into one of L groups according to the nearest view value. This produces L view-labeled face image subsets for learning view-subspaces of faces. Another training set of nonface images is also used for training face detection.

Now, there are L+1 classes indexed in the following by l, with l∈{0,1, . . . , L−1} corresponding to the L views of faces and l=L corresponding to the nonface class. Two tasks, face detection and pose estimation, are performed jointly by classifying the input Ip into one of the L+1 classes. If the input is classified into one of the L face classes , a face is detected and the corresponding view is the estimated pose; otherwise, the input pattern is considered as a nonface pattern.

The learning for face detection and pose estimation using kernel machines is carried out in two stages: one for kernel principal component analysis (KPCA) view-subspace learning, and one for kernel support vector classifier (KSVC) classifier training. Stage 1 training aims to learn the L KPCA view-subspaces from the L face view subsets. One set of kernel principal components (KPCs) are learned form each view subset. The most significant components (e.g., the top 50) are used as the basic vectors to construct the view-subspace. The learning in this stage yields L view-subspaces, each determined by a set of support vectors and the corresponding coefficients. The KPCA in each view channel effectively performs a nonlinear mapping from the input image space to the output KPCA feature space (having the same dimension as the number of components in the most significant components).

Stage 2 aims to train L KSVC's to differentiate between face and nonface patterns for face detection. This uses a training set consisting of a nonface subset as well as L view face subsets. Once KSVC is trained for each view to perform the L+1-class classification based on the features in the corresponding KPCA subspace. The projection onto the KPCA subspace of the corresponding view is used as the feature vector. The well-known one-against-the-rest method is used for solving the multi-class problem in a KSVC. Stage 2 gives L KSVCs.

In the testing stage, a test sample is presented to the KPCA feature extractor for each view l to obtain the feature vector for that view. The corresponding KSVC of that view calculates an output vector $y_t = (y_t^c | c=0, \ldots, L)$ as the responses of the L+1 classes to the input. This is done for all the L view channels so that L such output vectors $\{y_t | l=0, \ldots, L-1\}$ are produced. The value $y_t^c$ is the evidence for the judgment that the input Ip belongs to class c in terms of the features in the l-th view KPCA subspace. The final classification decision is made by fusing the evidences from all the L view channels. One way for the fusing is to sum the evidences; that is, for each class c=0, . . . ,L, the following is calculated:

$$y^c(Ip) = \sum_{l=0}^{L-1} y_l^c$$

This calculation gives the overall evidence for classifying Ip into class c. The final decision is made by maximizing the evidence: Ip belongs to c* if $c^* = \text{argmax}_c y^c(Ip)$.

Continuing with FIG. 7, processing then proceeds based on whether the face is verified by the multi-view face detection (act 336). If the face is verified, then the face is upgraded from a face candidate to a face (act 328) and the hierarchical verification process is completed (act 330). However, if the face is not verified, then the candidate is dropped from tracking list 146 of FIG. 3 (act 338), and the hierarchical verification process is completed (act 330).

In situations where there is no video content to be analyzed for hierarchical verification, audio cues alone can be used for verification when appropriate. For example, audio cues alone may be used when the person whose face is being tracked is talking continuously, or when well-known audio speaker based identification is performed (thereby allowing sound sources to be tied to individual speaker's voices, and verification performed by determining whether the voice coming from a particular sound source location matches the same speaker identification as was previously received from that sound source location).

Multi-Cue Tracking

Once a face is detected in a frame of video content, the face is tracked by multi-cue tracking module 144 of FIG. 3 in subsequent frames of the video content. The participant whose face is being tracked may move about, and thus the location of the face may be different in different frames of the video content. Furthermore, the participant may rotate his or her head (e.g., so that his or her face no longer looks directly at the video capture device), various occlusions may occur (e.g., the participant may pass his or her hand in front of his or her face), lighting may change, and so forth. Multi-cue tracking module 144 attempts to account for these various changes that may occur from frame to frame. Additionally, because of these changes, some cues may become unreliable to track. Multi-cue tracking module 144 also attempts to account for these changes in cue reliability that may occur from frame to frame.

Various cues are used by tracking module 144 in tracking a face. In one implementation, these tracking cues include the shape of the face (which is modeled as an ellipse), motion, edges, foreground color, and background color. Alternatively, one or more of these cues may not be used, or additional cues may be used, such as audio cues.

Multi-cue tracking module 144 may use audio cues to assist in tracking (or as the sole basis for tracking) when audio content is available. The audio-based tracking is performed based on sound source location process(es), and is performed in the same manner as audio-based detection is performed by audio-based initialization module 158 of FIG. 3 discussed above.

Figure 9:
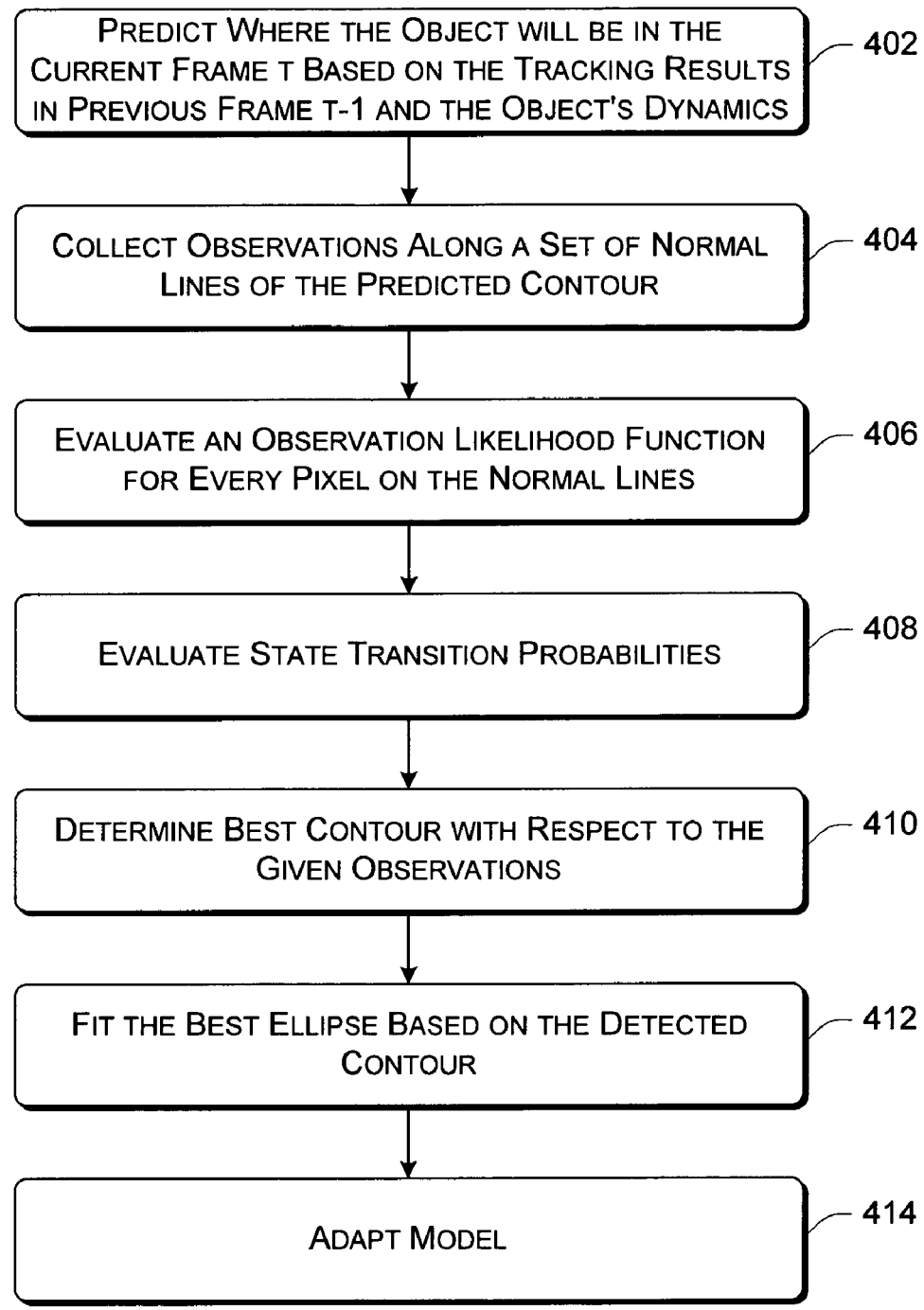
FIG. 9 is a flowchart illustrating an exemplary process for performing multi-cue tracking.

FIG. 9 is a flowchart illustrating an exemplary process 400 for performing multi-cue tracking. Process 400 is performed by multi-cue tracking module 144 of FIG. 3, and may be performed in software.

Initially, a prediction is made as to where the object will be in the current frame t based on the tracking results from the previous frame t−1 and the object's dynamics (modeled by the well-known Langevin process, and discussed in more detail below) (act 402). Observations are collected along a set of normal lines of the predicted contour of the object (act 404), and an observation likelihood function is evaluated for every pixel on the normal lines (act 406). The state transition probabilities from frame t−1 to frame t are evaluated (act 408), and the best contour with respect to the given observations is determined (act 410). The best ellipse is fitted to the image of frame t based on the detected contour (act 412), and the model is adapted for use with the next frame t+1 (act 414).

Multi-cue tracking module 144 includes various modules for performing the acts of FIG. 9. In the illustrated example, tracking module 144 includes: an observation likelihood module 168, a smoothness constraint module 170, a contour selection module 172, and a model adaptation module 174.

Multi-cue tracking module 144 focuses on tracking human heads, which have an elliptical shape (approximately 1:1.2). The human head for the face being tracked is represented by a model that is an ellipse having various tracking cues. When analyzing an image of a frame of video content, the model is compared to various locations of the image and a determination made as to which location most closely matches the model. This location that most closely matches the model is selected as the face in the new frame.

Figure 10:
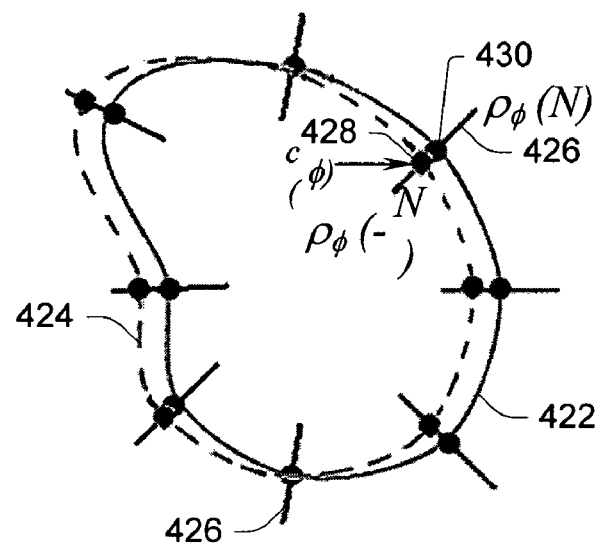
FIG. 10 illustrates exemplary modeling and comparing for multi-cue tracking in additional detail.

FIG. 10 illustrates this modeling and comparison in additional detail. In FIG. 10, a solid curve 422 represents a predicted contour of a human head in a particular frame t based on the tracking results from the immediately preceding frame t−1. The dashed curve 424 represents the true contour of the human head in frame t. A set of measurements are collected along multiple (M) normal lines 426 of the predicted contour 422. The point 428 ($c(\phi)$) is the true contour point on the $\phi^{th}$ normal line. The point 430 ($\rho_\phi(N)$) is the predicted contour point on the $\phi_{th}$ normal line. Multi-cue tracking module 144 attempts to locate the true contour 424 by having as many contour points as possible on the predicted contour 422 be the same as the contour points on the true contour line 424.

Observation likelihood module 168 of FIG. 3 generates a value $\rho_\phi(\lambda)$, which denotes the image intensity at pixel $\lambda$ on line $\phi$, as follows:

$$\rho_\phi(\lambda)=I(x_{\lambda,\phi}, y_{\lambda,\phi})$$

where $\phi$ ranges from 1 to M (the total number of normal lines 246) and $\lambda$ ranges from −N to N along the normal line (each normal line has 2N+1 pixels), $x_{\lambda,\phi}$, $y_{\lambda,\phi}$ is the corresponding image coordinate of the pixel $\lambda$ on the $\phi^{th}$ normal line, and $I(x_{\lambda,\phi}, y_{\lambda,\phi})$ is the image intensity at point $(x_{\lambda,\phi}, y_{\lambda,\phi})$.

To detect the contour points, different cues (e.g., edge intensity, color model of the foreground and background) and prior constraints (e.g. contour smoothness constraint) can be integrated by using a Hidden Markov Model (HMM). Hidden Markov Models are well-known to those skilled in the art, and thus will not be discussed further except as they pertain to the automated tracking of multiple individuals as described herein. The hidden states of the HMM are the true contour points on each normal line, (denoted as $s=\{s_1 \ldots, s_\phi, \ldots, s_M\}$). The observations of the HMM, $O=\{O_1, \ldots, O_\phi, \ldots O_M\}$, are collected along each normal line $\phi$. A HMM is specified by the number of states (in our case, 2N+1), the observation model $P(O_\phi|s_\phi)$, and the transition probability $p(s_\phi|s_{\phi-1})$.

Observation likelihood module 168 proceeds to generate a multi-cue observation likelihood function as follows. The observation on line $\phi$ (represented as $O_\phi$) can include multiple cues, e.g., pixel intensity (i.e., $\rho_\phi(\lambda)$, $\lambda \in [-N, N]$) and edge intensity (i.e., $z_\phi$) along the line. The observation likelihood model of the edge detection results $z_\phi$ can be derived using any of a variety of conventional edge detection processes, such as the well-known Sobel edge detector or Canny edge detector. Due to noise and image clutter, there can be multiple edges along each normal line $\phi$. The value J is used to represent the number of detected edges ($z_\phi=(z_1, z_2, \ldots, z_J)$). Of the J detected edges, at most one is on the true contour line 424 of FIG. 10. We can therefore define J+1 hypotheses:

$$H_0=\{e_j=F: j=1, \ldots, J\}$$

$$H_1=\{e_j=T, e_k=F: k=1, \ldots, J, k \neq j\}$$

where $e_j=T$ means that the jth edge is associated with the true contour line, and $e_j=F$ means that the jth edge is not associated with the true contour line. Hypothesis $H_0$ therefore means that none of the edges is associated with the true contour line.

Assuming that the image clutter is a well-known Poisson process along the line with spatial density $\gamma$ and the true target measurement is normally distributed with standard deviation $\sigma_z$, the edge likelihood model is obtained as follows:

$$p(z_\phi \mid s_\phi = \lambda_\phi) \propto 1 + \frac{1}{\sqrt{2\pi}\, \sigma_z q \gamma} \sum_{m=1}^{J} \exp\left(-\frac{(z_m - \lambda_\phi)^2}{2\sigma_z^2}\right)$$

where q is the prior probability of hypothesis $H_0$.

In addition to the edge likelihood model, other cues about the region properties of the foreground and background, e.g., mixture color models, are integrated into the HMM framework. Let p(v|FG) and p(v|BG) represent the color distribution for the foreground (FG) and background (BG), respectively. The posterior probabilities P(BG|v) and P(FG|v) can be derived as follows:

$$P(BG \mid v) = \frac{p(v \mid BG)}{p(v \mid BG) + p(v \mid FG)} \tag{1}$$

$$P(FG \mid v) = \frac{p(v \mid FG)}{p(v \mid BG) + p(v \mid FG)}$$

If $s_\phi = \lambda_\phi$ is the contour point on line $\phi$, then the segment $[-N, s_\phi]$ is on the foreground and the segment $[s_\phi+1, N]$ is on the background. Combining the edge likelihood model and the color posterior probabilities results in the following multi-cue observation likelihood function for the HMM:

$$P(O_\phi \mid s_\phi) = p(z \mid s_\phi) \cdot \prod_{i=-N}^{s_\phi} P(BG \mid v = \rho_\phi(i)) \cdot \prod_{i=s_\phi+1}^{N} P(FG \mid v = \rho_\phi(i)) \tag{2}$$

Other cues, such as audio cues (e.g., based on sound source location and likelihood of a sound coming from a particular location) can also be integrated in analogous manners. In situations where there is no video content for analysis, solely the audio cues are used. Alternatively, in addition to or in place of such audio queues, audio can be used as proposal functions with unscented particle-filtering, discussed in more detail below.

Another component in HMM is the transition probability, which determines how a state at time t−1 transits to another state at time t. Smoothness constraint module 170 of FIG. 3 derives the transition probability.

In order to obtain a smooth contour, transition probabilities are used to encode a smoothness constraint and penalize roughness. Referring to FIG. 10, it can be seen that when the normal lines 426 are dense (e.g., on the order of 30 normal lines), the points of true contour line 424 on adjacent normal lines 426 tend to have the same displacement from the predicted contour line 422 (indexed as zero on each normal line). This correlation is used to help obtain a smooth contour.

In HMM, given current state $s_\phi$, the current observation $O_\phi$ is independent of previous state $s_{\phi-1}$ and previous observation $O_{\phi-1}$. In addition, because of the Markovian property, we have $p(s_\phi \mid s_1, s_2, \ldots s_{\phi-1}) = p(s_\phi \mid s_{\phi-1})$.

The contour smoothness constraint can then be captured by the state transition $p(s_\phi \mid s_{\phi-1})$ as follows:

$$p(s_\phi \mid s_{\phi-1}) = c \cdot \exp(-(s_\phi - s_{\phi-1})^2 \sigma_s^2) \tag{3}$$

where c is a normalization constant and $\sigma_s$ is a predefined constant that regulates the smoothness of the contour. This transition probability penalizes sudden changes of the contour points between adjacent lines, hence resulting in a smooth contour. The best contour can then be obtained by contour selection module 172.

The transition probability generated by smoothness constraint module 170 based on calculation (3) above considers the contour point without regard for other pixels on the normal lines. Alternatively, smoothness constraint module 170 uses a JPDAF (joint probability data association filter)—based method to encode not only the contour smoothness constraint, but also the region smoothness constraint observed on multiple (e.g., all) the pixels on the normal lines. In the illustrated example, a JPDAF process based on dynamic programming is used to improve real-time performance.

Under typical conditions, pixel intensity values of parts of the human body (e.g., face or head) change smoothly inside their regions. It is therefore a reasonable assumption that in human tracking, the foreground and background have smooth region properties so that the measurements on two adjacent lines are similar. Let $s_\phi$ and $s_{\phi+1}$ be the contour points on line $\phi$ and line $\phi+1$, respectively. These two contour points segment the two lines into foreground segments and background segments. Based on the region smoothness assumption, not only should $s_\phi$ and $s_{\phi+1}$ be close to each other, but all the other pixels on the two lines should also match well. To obtain the region smoothness constraint, a joint probability data association filter is used to conduct the line matching. That is, it is not a single point to single point matching problem, but rather a (2N+1) points to (2N+1) points matching problem. By considering all the pixels along the lines together, more robust matching results can be obtained. The transition probabilities based on this JPDAF process are therefore typically more accurate. Let $D^F(i,j)$ and $D^B(i,j)$ be the matching distances of the foreground ([−N, i] on line $\phi$ and [−N,j] on line $\phi+1$) and background ([i+1, N] on line $\phi$ and [j+1, N] on line $\phi+1$), respectively. A transition probability can then be defined as follows to replace the one discussed above with reference to calculation (3):

$$\log(p(s_2 \mid s_1)) = D^F(s_1,s_2) + D^B(s_1,s_2) + (s_2 - s_1)^2 / \sigma_s^2 \tag{4}$$

Figure 11:
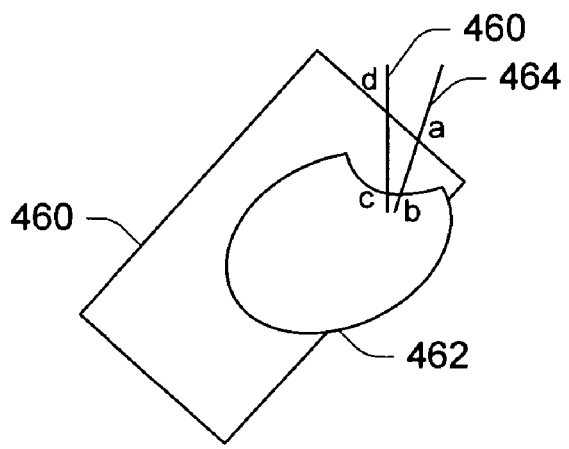
FIG. 11 is an image illustrating the region smoothness concept.
Figure 12:
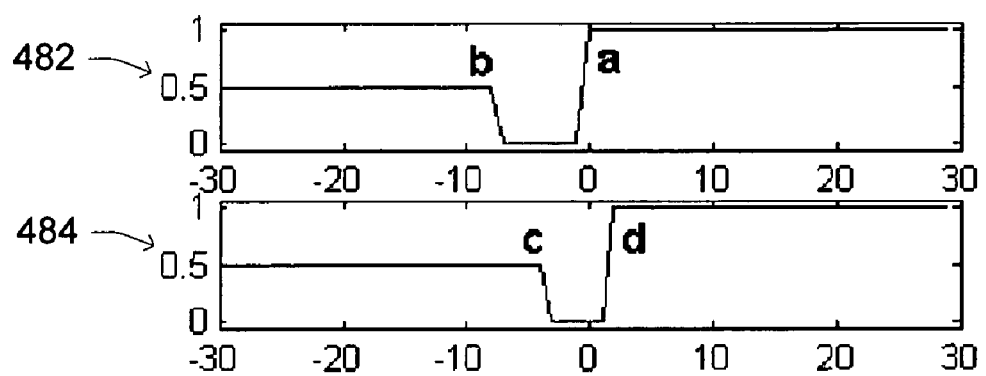
FIG. 12 illustrates measurements of intensities from FIG. 11.

The region smoothness concept can be illustrated by a synthesized image illustrated in FIG. 11. There are two regions illustrated: a rectangular region 460 that represents background clutter and a roughly circular region 462 that represents the object. Two adjacent normal lines 464 and 466 are also illustrated. Points a and b are detected edge points on line 464, while points c and d are detected edge points on line 466. The goal is to find where the contour points are on these two lines 464 and 466. The measurements of intensities along the two lines 464 and 466 are illustrated in FIG. 12. Measurement 482 represents the intensities along line 464, while measurement 484 represents the intensities along line 466. Measurements 482 and 484 are similar to each other except for some distortions. Based on the contour smoothness constraint only, the contour from a to c and the contour from b to c have almost the same amount of smoothness energy because $|a-c| \cong |b-c|$. However, if we consider the region smoothness assumption as well, the possible contour can be ad or bc, but not ac or bd. The contour candidates ad and bc can further be discriminated by HMM based on all the observation lines.

Figure 13:
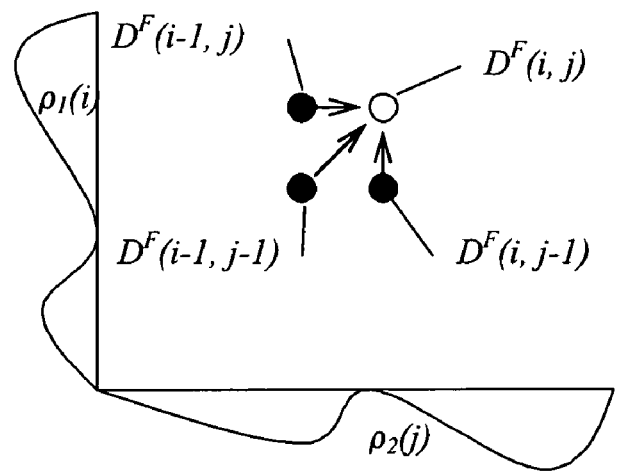
FIG. 13 illustrates exemplary calculation of a matching distance graphically.

To get the new transition probabilities, the matching between all the possible pairs of states $((2N+1)^2)$ is calculated. FIG. 13 illustrates calculation of the matching distance graphically. Given lines 464 and 466, the calculation of the matching distance can be explained in the following recursive equation and can be seen in FIG. 13:

$$D^F(i,j) = \min \begin{cases} D^F(i-1,j) + d(\rho_1(i), \rho_2(j)) \\ D^F(i, j-1) + d(\rho_1(i), \rho_2(j)) \\ D^F(i-1, j-1) + d(\rho_1(i), \rho_2(j)) \end{cases}$$

where $d(.,.)$ is the cost of matching two pixels. $D^F(i,j)$ is the best matching distance between segment $[-N, i]$ on line 464 and segment $[-N, j]$ on line 466. Starting from $D^F(0, j) = D^F(i,0) = 0$, where $i,j \in [-N, N]$, use the above recursion to obtain the matching distance $D^F(i,j)$ from $i=-N$ to N and $j=-N$ to N. An analogous process is gone through to calculate the $D^B(i,j)$, but starting from $D^B(N,N) = 0$ to $D^B(-N, -N)$. After obtaining all the matching distances, the state transition probabilities can be computed and contour tracking can be accomplished by contour selection module 172 of FIG. 3, discussed in more detail below.

Given the observation sequence $O = \{O_\phi, \phi \in [1, M]\}$ and the transition probabilities $a_{i,j} = p(s_{\phi+1} = j | s_\phi = i)$, contour selection module 172 determines the best contour found by finding the most likely state sequence s* using the well-known Viterbi algorithms as follows:

$$s^* = \underset{s}{\mathrm{argmax}} P(s \mid O) = \underset{s}{\mathrm{argmax}} P(s, O)$$

A value $V(\phi, \lambda)$ is defined as follows:

$$V(\phi, \lambda) = \max_{s_{\phi-1}} P(O_{\phi-1}, s_{\phi-1}, s_\phi = \lambda)$$

Using the Markov conditional independence assumptions, $V(\phi, \lambda)$ can be recursively computed as follows:

$$V(\phi, \lambda) = P(O_\phi \mid s_\phi = \lambda) \cdot \max_j P(s_\phi = \lambda \mid s_{\phi-1} = j) V(j, \phi - 1)$$

$$j^*(\phi, \lambda) = P(O_\phi \mid s_\phi = \lambda) \cdot \underset{j}{\mathrm{argmax}} P(s_\phi = \lambda \mid s_{\phi-1} = j) V(j, \phi - 1)$$

with the initialization $V(1, \lambda) = \max_{s_1} P(O_1 | s_1) P(s_1)$, where the initial state probabilities $P(s_1) = 1/(2N+1)$, $s_1 \in [-N, N]$. The term $j^*(\phi, \lambda)$ records the "best previous state" from state $\lambda$ at line $\phi$. Therefore, at the end of the sequence, $\max_s P(O,s) = \max_\lambda V(M, \lambda)$ is obtained. The optimal state sequence s* can be obtained by back tracking $j^*$, starting from $s_M^* = \mathrm{argmax}_\lambda V(M, \lambda)$, with $s_{\phi-1} = j^*(s_\phi^*, \phi)$.

Given the best state sequence $s^* = \{s_1^*, \ldots, s_M^*\}$, the corresponding image coordinate of the best contour point $s_\phi^*$ on line $\phi$ is denoted by $[x_\phi, y_\phi]$. Because an ellipse is used as the parametric contour model, for each contour point $[x_\phi, y_\phi]$, the following holds:

$$ax_\phi^2 + by_\phi^2 + cx_\phi y_\phi + dx_\phi + ey_\phi - 1 = 0$$

A matrix representation of these equations is:

$$A \cdot f = b$$

where $$A = \begin{bmatrix} x_1^2 & y_1^2 & x_1 y_1 & x_1 & y_1 \\ \vdots & & & & \vdots \\ x_M^2 & y_M^2 & x_M y_M & x_M & y_M \end{bmatrix}$$

and $b = [1, 1, \ldots, 1]^T$. The parameters of the best-fit ellipse $f^* = [a, b, c, d, e]^T$ can be obtained by the least mean square (LMS) solution:

$$f^* = (A^T A)^{-1} A^T b \qquad (5)$$

The above ellipse representation $f = [a, b, c, d, e]^T$ is convenient mathematically. But there is no clear physical interpretation of the five parameters. In tracking, a different 5-element ellipse representation is normally used:

$$\theta = [x, y, \alpha, \beta, \Phi]$$

where $(x, y)$ is the center of the ellipse, $\alpha$ and $\beta$ are the lengths of the major and minor axes of the ellipse, and $\phi$ is the orientation of the ellipse. Because f and $\theta$ are two representations of the same ellipse, they are used interchangeably herein.

In a dynamic environment, both the object(s) being tracked and the background may gradually change appearance. Thus, model adaptation module 174 adapts the observation likelihood models dynamically. One way to adapt the observation likelihood models is to completely trust the contour returned by the Viterbi algorithm at frame t−1, and average all the pixels inside and outside the contour to obtain the new foreground/background color model at frame t. However, if an error occurs at frame t−1, this procedure may adapt the model in the wrong way. Thus, model adaptation module 174 trains the observation models in a probabilistic way.

Instead of completely trusting the contour obtained at frame t−1, a decision is made of how to update the observation models by using the forward-backward algorithm. The "forward probability distribution" is defined as follow:

$$\alpha_\phi(s) = p(O_1, O_2, \ldots, O_\phi, s_\phi = s)$$

which can be computed using recursion as follows:

$$\alpha_1(s) = p(s_1 = s) p(O_1 \mid s_1 = s)$$

$$\alpha_{\phi+1}(s) = \left[\sum_u \alpha_\phi(u) a_{u,s}\right] p(O_{\phi+1} \mid s_{\phi+1} = s)$$

Similarly, the "backward probability distribution" is defined as:

$$\beta_\phi(s) = p(O_{\phi+1}, O_{\phi+2}, \ldots, O_M, s_\phi = s)$$

which can be computed using recursion as follows:

$$\beta_M(s) = 1$$

$$\beta_\phi(s) = \sum_u a_{s,u} p(O_{\phi+1} \mid s_{\phi+1} = u) \beta_{\phi+1}(u)$$

After computing the forward and backward probability, we can compute the probability of each state at line φ as follows:

$$P(s_\phi = s \mid O) = \frac{\alpha_\phi(s)\beta_\phi(s)}{\sum_u \alpha_\phi(u)\beta_\phi(u)}, s \in [-N, N]$$

which represents the probability of having the contour point at s on the measurement line φ.

Based on these probabilities, the probability of pixel $\lambda_\phi$ being in the foreground (or background) can be computed by integrating $P(s_\phi=s|O)$ along the normal line as follows:

$$P(\lambda_\phi \in BG) = 1 - P(\lambda_\phi \in FG) = \prod_{s=-N}^{\lambda_\phi} p(s_\phi = s \mid O)$$

This probability gives us a robust way to weigh different pixels during adaptation of the observation models. The more confidently classified pixels contribute more to the color model while the less confidently classified pixels contribute less:

$$p(v \mid BG) = \frac{\sum_{s=-N}^{N} P(s \in BG) \cdot O_\phi(s)}{\sum_{s=-N}^{N} P(s \in BG)} \quad (6)$$

$$p(v \mid FG) = \frac{\sum_{s=-N}^{N} P(s \in FG) \cdot O_\phi(s)}{\sum_{s=-N}^{N} P(s \in FG)}$$

The new adapted models reflect the changing color distributions during the tracking. The new adapted models are then plugged back into Equation (1) during the contour searching in the next frame. In the illustrated example, the transition probabilities are not trained because they typically tend to remain relatively constant during the tracking process. Alternatively, the transition probabilities may be trained in a manner analogous to the training of the color distributions.

Figure 14:
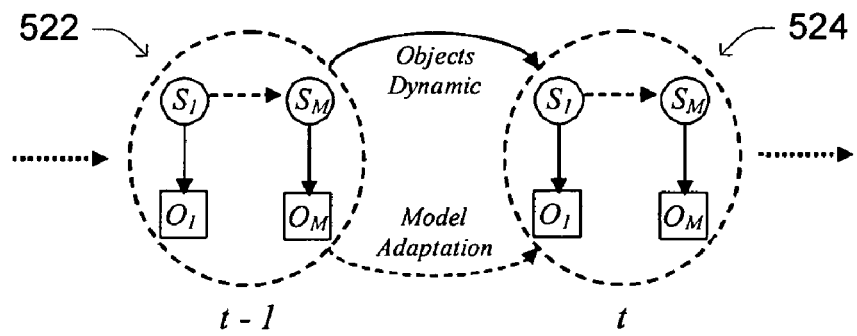
FIG. 14 illustrates exemplary tracking of an object from one frame to the next.

Returning to FIG. 9, the multi-cue tracking process 400 can be further seen with reference to FIG. 14. FIG. 14 illustrates the tracking of an object from one frame 522 at time t−1 to the next frame 524 at time t. A prediction is made (act 402) of where the object will be in the current frame t based on the tracking results in previous frame t−1 and the object's dynamics. Observations are collected along a set of normal lines of the predicted contour (act 404). The well-known Langevin process is used to model the human movement dynamics:

$$\begin{bmatrix} \theta_t \\ \dot{\theta}_t \end{bmatrix} = \begin{bmatrix} 1 & \tau \\ 0 & a \end{bmatrix} \begin{bmatrix} \theta_{t-1} \\ \dot{\theta}_{t-1} \end{bmatrix} + \begin{bmatrix} 0 \\ b \end{bmatrix} m_t$$

where $\theta=[x, y, \alpha, \beta, \phi]$ is the parametric ellipse, $a=\exp(-\beta_\theta \tau)$, $b=\bar{v}\sqrt{1-a^2}$. $\beta_\theta$ is the rate constant, m is a thermal excitation process drawn from Gaussian distribution N(0, Q), τ is the discretization time step, and $\bar{v}$ is the steady-state root-mean-square velocity.

The observation likelihood function is evaluated (act 406) for every pixel on normal line φ:

$$p(O_\phi \mid s_\phi = \lambda_\phi), \lambda_\phi \in [-N,N], \phi \in [1,M]$$

based on edge detection and the color value of each pixel on the line by using calculation (2) above. The state transition probabilities based on JPDAF are also evaluated (act 408) as shown in calculation (4) above.

With the previously computed observation likelihood and the transition probability matrix, the best contour with respect to the given observations is found by the Viterbi Algorithm (act 410), and, based on the detected contour, the best ellipse is fit (act 412) using calculation (6) above.

Then, using forward-backward algorithm to estimate a soft classification of each pixel (to foreground and background) on the normal lines, update the color model of foreground and background based on calculation (6) above (act 414).

The process 400 of FIG. 9 is repeated for each frame of the video content.

Multi-cue tracking module 144 attempts to account for cue reliability and changes in cue reliability. For example, the properties of both foreground and background are modeled (see, calculation (1) above), and the model is used in calculation (2) above to detect the boundary (e.g., if the color of the foreground and background are similar, it will not contribute much for the boundary detection and the process will rely more on other cues that are more discriminant, such as motion). The model of the background and foreground is also adapted during the tracking which is expressed by calculation (6) above.

Various modifications can also be made to the multi-cue tracking process discussed above. According to one alternative, a set of one or more feature points of the face being tracked is maintained and each new frame is analyzed to locate that set of feature points. Once the set of feature points is located, the position of the face can be estimated at a coarse level based on the located set of points, and then this coarse estimation used as the initial guess in the parametric contour-tracking process discussed above. In other words, the new frame is analyzed to locate an initial guess for the parametric contour-tracking process rather than relying on the predicted location discussed above. This modification can be particularly useful in situations where the object motion between successive frames is large (large enough that the predicted location discussed above may not be close enough to the actual contour location in the subsequent frame).

A variety of different feature points can be tracked, such as eye corners, mouth corners, nostrils, etc. Sound sources in the audio can also be tracked as feature points, in addition to or in place of the visual features. A variety of different feature tracking processes can be used, such as the well-known Lucas-Kanade feature tracker. Additional information regarding the Lucas-Kanade feature tracker can be found in J. Shi and C. Tomasi, "Good Features to Track," IEEE Conf. on Computer Vision and Pattern Recognition, pp. 593-600, 1994.

Another modification that can be made to the multi-cue tracking process discussed above is, when performing probabilistic sampling, to sample from the feature points (detected contour points) rather than from the state space. For example, several feature points could be sampled from all the detected contour points and a parametric shape fit on the sampled contour points.

Another modification that can be made to the multi-cue tracking process is to track multiple possible locations for the face—in other words, track multiple hypotheses rather than one hypothesis. Particle-filtering techniques can be used to maintain multiple hypotheses so that weak hypotheses are not immediately dropped. Rather, weak hypotheses are maintained and allowed time to prove they are good choices. Next is described one of such particle filter techniques, referred to as unscented particle filter.

An unscented particle filter (UPF) that uses an unscented Kalman filter (UKF) is used by multi-cue tracking module 144 to track multiple hypotheses. The unscented transformation (UT) is used to compute the mean and covariance up to the second order (third for Gaussian prior) of the Taylor series expansion of g( ). Let $n_x$ be the dimension of x, $\bar{x}$ be the mean of x, and $P_x$ be the covariance of x, the UT computes mean and covariance of y=g(x) as follows:

First, deterministically generate $2n_x+1$ sigma points $S_i = (X_i, W_i)$:

$$X_0 = \bar{x}$$

$$X_i = \bar{x} + (\sqrt{(n_x+\lambda)P_x})_i, i=1,\ldots,n_x$$

$$X_i = \bar{x} - (\sqrt{(n_x+\lambda)P_x})_i, i=n_x+1,\ldots,2n_x$$

$$W_0^{(m)} = \lambda/(n_x+\lambda),\ W_0^{(c)} = W_0^{(m)} + (1-\alpha^2+\beta) \quad (7)$$

$$W_i^{(m)} = W_i^{(m)} = 1/(2\cdot(n_x+\lambda))\ i1,\ldots,2n_x$$

$$\lambda = \alpha^2(n_x+\kappa) - n_x$$

where κ is a scaling parameter that controls the distance between the sigma points and the mean $\bar{x}$, α is a positive scaling parameter that controls the higher order effects resulted from the non-linear function g( ), and β is a parameter that controls the weighting of the $0^{th}$ sigma point, and $(\sqrt{(n_x+\lambda)P_x})_i$ is the $i^{th}$ column of the matrix square root. In one implementation, for the scalar case, α=1, β=0 and κ=2. Note that the $0^{th}$ sigma point's weight is different for calculating mean and covariance.

Then, the sigma points are propagated through the nonlinear transformation:

$$Y_i = g(X_i)\ i=0,\ldots 2n_x \quad (8)$$

and the mean and covariance of y are calculated as follows:

$$\bar{y} = \sum_{i=0}^{2n_x} W_i^{(m)} Y_i,\ P_y = \sum_{i=0}^{2n_x} W_i^{(c)}(Y_i - \bar{y})(Y_i - \bar{y})^T \quad (9)$$

The mean and covariance of y is accurate up to the second order of the Taylor series expansion.

The unscented Kalman filter (UKF) can be implemented using UT by expanding the state space to include the noise component: $x_t^a = [x_t^T m_t^T n_t^T]^T$. Let $N_a = N_x + N_m + N_n$ be the dimension of the expanded state space, where $N_m$ and $N_n$ are the dimensions of noise $m_t$ and $n_t$, and Q and R be the covariance for noise $m_t$ and $n_t$, the UKF can be summarized as follows:

Initialization:

$$\bar{x}_0^a = [\bar{x}_0^T 0 0]^T,\ P_0^a = \begin{bmatrix} P_0 & 0 & 0 \\ 0 & Q & 0 \\ 0 & 0 & R \end{bmatrix} \quad (10)$$

Iterate the following for each time instance t:

a) Calculate the sigma points using the procedure in calculation 7 above:

$$X_{t-1}^a = [\bar{x}_{t-1}^a\ \bar{x}_{t-1}^a \pm \sqrt{(n_a+\lambda)P_{t-1}^a}] \quad (11)$$

b) Time update:

$$X_{t|t-1}^x = f(X_{t-1}^x, X_{t-1}^v),\ \bar{x}_{t|t-1} = \sum_{i=0}^{2n_a} W_i^{(m)} X_{i,t|t-1}^x \quad (12)$$

$$Y_{t|t-1} = h(X_{t|t-1}^x, X_{t-1}^n),\ \bar{y}_{t|t-1} = \sum_{i=0}^{2n_a} W_i^{(m)} Y_{i,t|t-1}^x \quad (13)$$

$$P_{t|t-1} = \sum_{i=0}^{2n_a} W_i^{(c)}[X_{i,t|t-1}^x - \bar{x}_{t|t-1}][X_{i,t|t-1}^x - \bar{x}_{t|t-1}]^T \quad (14)$$

c) Measurement update:

$$P_{y_t y_t} = \sum_{i=0}^{2n_a} W_i^{(c)}[Y_{i,t|t-1} - \bar{y}_{t|t-1}][Y_{i,t|t-1} - \bar{y}_{t|t-1}]^T \quad (15)$$

$$P_{x_t y_t} = \sum_{i=0}^{2n_a} W_i^{(c)}[X_{i,t|t-1}^x - \bar{x}_{t|t-1}][Y_{i,t|t-1}^x - \bar{y}_{t|t-1}]^T \quad (16)$$

$$K_t = P_{x_t y_t} P_{y_t y_t}^{-1} \quad (17)$$

$$\bar{x}_t = \bar{x}_{t|t-1} + K_t(y_t - \bar{y}_{t|t-1}),\ P_t = P_{t|t-1} - K_t P_{y_t y_t} K_t^T \quad (18)$$

With UKF, the most recent observation can be easily incorporated into the state estimation (e.g., measure update c) above); however, it makes a Gaussian assumption of the state distribution. The particle filters, on the other hand, can model arbitrary distributions, but incorporating new observation $y_t$ into the proposal distribution is difficult. UKF is used to generate the proposal distribution for the particle filter, resulting in the hybrid UPF. Specifically, the proposal distribution for each particle is as follows:

$$q(x_t^{(i)}|x_{0:t-1}^{(i)} y_{1:t}) = N(\bar{x}_t^{(i)}, P_t^{(i)}),\ i=1,\ldots,N \quad (19)$$

where $\bar{x}_t$ and $P_t$ are the mean and covariance of x, computed using UKF (calculations (10)-(18)). It should be noted that, even though the Gaussian assumption is not realistic to approximate the posterior distribution $p(x_t|x_{t-1}, y_{0:t})$, it is less a problem to generate individual particles with distinct $\bar{x}_t$ and $P_t$. Furthermore, because UKF approximates the mean and covariance of the posterior up to the second order, the non-linearity of system is well preserved. The UPF process is easily obtained by plugging the UKF step and calculation (19) into the generic particle filter algorithm.

Figure 15:
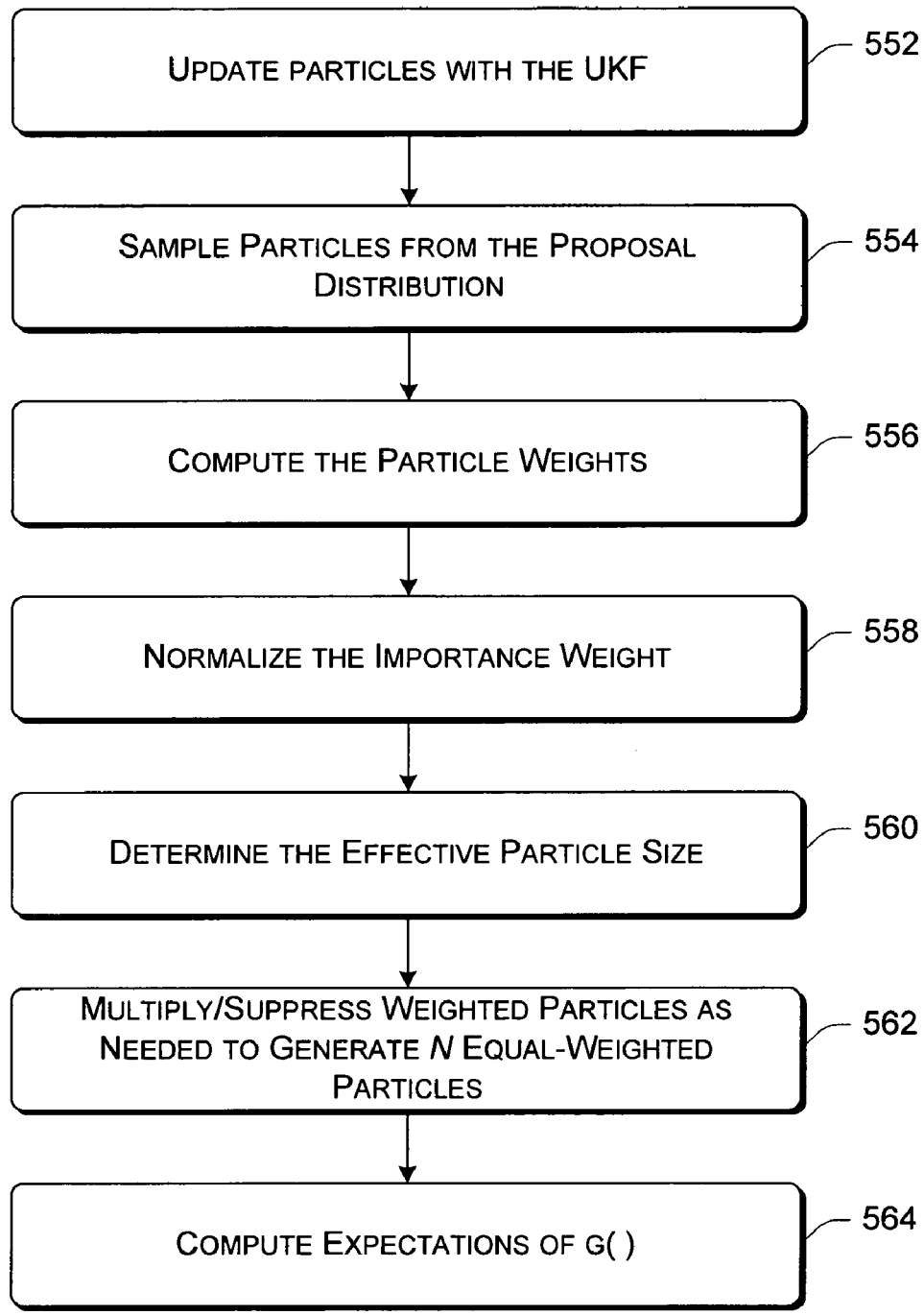
FIG. 15 is a flowchart illustrating an exemplary unscented particle filter process.

FIG. 15 is a flowchart illustrating an exemplary UPF process 550. The process of FIG. 15 is performed by multi-cue tracking module 144 of FIG. 3, and may be performed in software.

Initially, particles $x_t^{(i)}$, i=1, ..., N, are updated with the UKF using calculations (11)-(18) to obtain $\bar{x}_t^{(i)}$ and $p_t^{(i)}$ (act 552). Particles $x_t^{(i)}$, i=1, ..., N, are then sampled from the proposal distribution $q(x_t^{(i)}|x_{0:t-1}^{(i)}, y_{1:t}) = N(\bar{x}_t^{(i)}, P_t^{(i)})$ (act 554). The particle weights are then computed (act 556) using calculation (20) as follows:

$$\tilde{w}_t^{(i)} = \frac{p(y_{1:t} \mid x_{0:t}^{(i)}) p(x_{0:t}^{(i)})}{q(x_{0:t-1}^{(i)} \mid y_{1:t-1}) q(x_t^{(i)} \mid x_{0:t-1}^{(i)}, y_{1:t})} \quad (20)$$

$$= \tilde{w}_{t-1}^{(i)} \frac{p(y_{1:t} \mid x_{0:t}^{(i)}) p(x_{0:t}^{(i)})}{p(y_{1:t-1} \mid x_{0:t-1}^{(i)}) p(x_{0:t-1}^{(i)}) q(x_t^{(i)} \mid x_{0:t-1}^{(i)}, y_{1:t})}$$

$$= \tilde{w}_{t-1}^{(i)} \frac{p(y_t \mid x_t^{(i)}) p(x_t^{(i)} \mid x_{t-1}^{(i)})}{q(x_t^{(i)} \mid x_{0:t-1}^{(i)}, y_{1:t})}$$

The importance weight is then normalized (act 558) using calculation (21) as follows:

$$w_t(x_{0:t}^{(i)}) = \tilde{w}_t(x_{0:t}^{(i)}) \Big/ \sum_{i=1}^{N} \tilde{w}_t(x_{0:t}^{(i)}) \quad (21)$$

where the particles $\{x_{0:t}^{(i)}, w_t(x_{0:t}^{(i)})\}$ are drawn from the known distribution q, $\tilde{w}_t(x_{0:t}^{(i)})$ and $w_t(x_{0:t}^{(i)})$ are the unnormalized and normalized importance weights.

The effective particle size S is then determined (act 560) using calculation (22) as follows:

$$\tilde{w}_t^{(i)} = \tilde{w}_{t-1}^{(i)} \frac{p(y_t \mid x_t^{(i)}) p(x_t^{(i)} \mid x_{t-1}^{(i)})}{q(x_t^{(i)} \mid x_{0:t-1}^{(i)}, y_{1:t})} = \tilde{w}_{t-1}^{(i)} p(y_t \mid x_t^{(i)}) \quad (22)$$

If $S<S_T$, then multiply (or suppress) weighted particles to generate N equal-weighted particles (act 562). The expectations of g( ) are then computed (act 564) using calculation (23) as follows:

$$E_p(g(x_{0:t})) = \lim_{N \to \infty} \sum_{i=1}^{N} q(x_{0:t}^{(i)}) w_t(x_{0:t}^{(i)}) \quad (23)$$

The conditional mean of $x_t$ can be computed with $g_t(x_t)=x_t$, and conditional covariance of $x_t$ can be computed with $g_t(x_t)=x_t x_t^T$.

Figure 16:
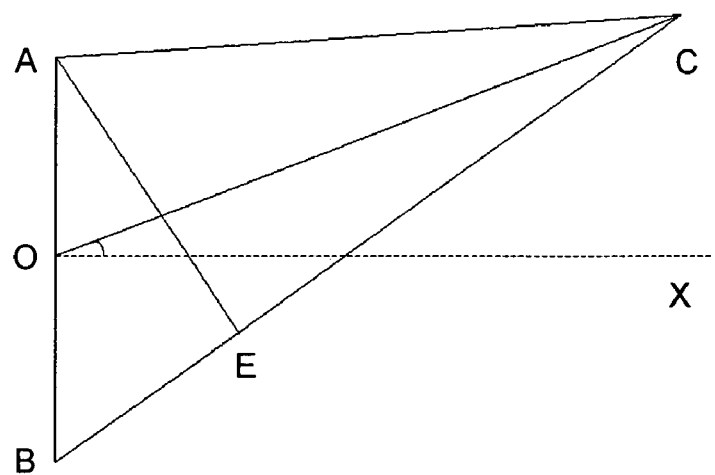
FIG. 16 illustrates an exemplary multiple-microphone environment.

Using the UPF process 550 of FIG. 15 to track participants based on audio will now be discussed. Two microphones are typically sufficient to estimate the horizontal panning angle. Tracking based on the horizontal panning angle is discussed herein, and analogous operations can be performed to track based on the vertical tilting angle of the speaker. FIG. 16 illustrates an exemplary multiple-microphone environment. In FIG. 16, assume the two microphones are situated at locations A and B, and the sound source is situated at location C. When the distance of the sound source (i.e., |OC|) is much larger than the length of the microphone pair baseline |AB|, the panning angle $\theta = \angle COX$ can be estimated as follows:

$$\theta = \angle COX \approx \angle BAE = \arcsin \frac{|BE|}{|AB|} = \arcsin \frac{D \times v}{|AB|} \quad (24)$$

where D is the time delay between the two microphones, and v=342 m/s is the speed of sound traveling in air.

In order to utilize the UPF framework in a tracking application, four entities are first established: system dynamics $x_t=f(x_{t-1},m_{t-1})$ to be used in calculation (12), system observation $y_t=h(x_t,n_t)$ to be used in calculation (13), likelihood $p(y_t|x_t)$ to be used in calculation (22), and innovation $y_t-\bar{y}_{t|t-1}$ to be used in calculation (18). Once these four entities are established, tracking proceeds straightforwardly using the UPF process 550 of FIG. 15.

The system dynamics model $x_t=f(x_{t-1},m_{t-1})$ is determined as follows. Let $x=[\theta,\dot{\theta}]^T$ be the state space, where they are the panning angle and velocity of the panning angle, respectively. To model the movement dynamics of a talking person, the well-known Langevin process $d^2\theta/dt^2 + \beta_\theta \cdot d\theta/dt = m$ is used, whose discrete form is:

$$\begin{bmatrix} \theta_t \\ \dot{\theta}_t \end{bmatrix} = \begin{bmatrix} 1 & \tau \\ 0 & a \end{bmatrix} \begin{bmatrix} \theta_{t-1} \\ \dot{\theta}_{t-1} \end{bmatrix} + \begin{bmatrix} 0 \\ b \end{bmatrix} m_t \quad (25)$$

$$a = \exp(-\beta_\theta \tau), \, b = \bar{v}\sqrt{1-a^2}$$

where $\beta_\theta$ is the rate constant, m is a thermal excitation process drawn from N(0,Q), $\tau$ is the discretization time step, and $\bar{v}$ is the steady-state root–mean-square velocity.

The system observation model $y_t=h(x_t,n_t)$ is determined as follows. The system observation $y_t$ is the time delay $D_t$. Based on calculation (24) above, the observation relates to the state by $$y_t = D_t = h(\theta_t, n_t) = |AB|v \sin \theta_t + n_t \quad (26)$$

where $n_t$ is the measurement noise, obeying a Gaussian distribution of N(0, R).

The likelihood model $p(y_t|x_t)$ is determined as follows. Let J be the number of peaks in the GCCF (generalized cross-correlation function). Of the J peak locations, at most one is from the true sound source. Therefore, define J+1 hypotheses can be defined:

$$H_0 = \{c_j = C : j=1, \ldots, J\}$$

$$H_j = \{c_j = T, c_k = C : k=1, \ldots, J, k \neq j\} \quad (27)$$

where $c_j=T$ means the $j^{th}$ peak is associated with the true sound source, $c_j=C$ otherwise. Hypothesis $H_0$ therefore means that none of the peaks is associated with the true source. The combined likelihood model is therefore:

$$p(y_t \mid x_t) = \pi_0 p(y_t \mid H_0) + \sum_{j=1}^{J} \pi_j p(y_t \mid H_j) \quad (28)$$

$$= \pi_0 U + N_m \sum_{j=1}^{J} \pi_j N(D_j, \sigma_D)$$

$$\text{s.t. } \pi_0 + \sum_{j=1}^{J} \pi_j = 1$$

where $\pi_0$ is the prior probability of hypothesis $H_0$, $\pi_j$, j=1, ..., J, can be obtained from the relative height of the $j^{th}$ peak, $N_m$ is a normalization factor, $D_j$ is the time delay corresponding the $j^{th}$ peak, U represents the uniform distribution, and N( ) represents the Gaussian distribution.

The innovation model $y_t - \bar{y}_{t|t-1}$ is determined as follows. The same as the likelihood model, the innovation model also needs to take into account the multi-peak fact:

$$y_t - \bar{y}_{t|t-1} = \sum_{j=1}^{J} \pi_j (D_j - \bar{y}_{t|t-1}) \qquad (29)$$

where $\bar{y}_{t|t-1}$ is the predicted measurement obtained from UKF (see calculation (18) above).

Using the UPF process 550 of FIG. 15 to track participants based on visual data is similar to that of tracking participants based on audible data. In order to utilize the UPF framework in a tracking application, four entities are first established: the system dynamics model $x_t = f(x_{t-1}, m_{t-1})$, the system observation model $y_t = h(x_t, n_t)$, the likelihood model $p(y_t|x_t)$ and the innovation model $y_t - \bar{y}_{t|t-1}$. Once these four entities are established, tracking proceeds straightforwardly using the UPF process 550 of FIG. 15.

The system dynamics model $x_t = f(x_{t-1}, m_{t-1})$ is determined as follows. Let (r, s) represent the image coordinate. In contour-based tracking, the system states are the position of the ellipse center and its horizontal and vertical velocity, i.e., $x_t = [r_t, s_t, \dot{r}_t, \dot{s}_t]^T$. Similar to the system dynamics model for audible data, the well-known Langevin process is adopted to model the human movement dynamics:

$$\begin{bmatrix} r_t \\ s_t \\ \dot{r}_t \\ \dot{s}_t \end{bmatrix} = \begin{bmatrix} 1 & 0 & \tau & 0 \\ 0 & 1 & 0 & \tau \\ 0 & 0 & a_r & 0 \\ 0 & 0 & 0 & a_s \end{bmatrix} \begin{bmatrix} r_{t-1} \\ s_{t-1} \\ \dot{r}_{t-1} \\ \dot{s}_{t-1} \end{bmatrix} + \begin{bmatrix} 0 \\ 0 \\ b_r \\ b_s \end{bmatrix} m_t \qquad (30)$$

The system observation model $y_t = h(x_t, n_t)$ is determined as follows. The ellipse is centered at the current state location $(r_t, s_t)$. K rays are generated from the ellipse center and intersect with the ellipse boundary. The ellipse center is used as the origin of a local coordinate system, so the intersections $(u_k, v_k)$, $k=1, 2, \ldots, K$, can be obtained as $$u_k = \sqrt{\tan^2 \varphi_k / (1.44 \tan^2 \varphi_k + 1)} \qquad (31)$$
$$v_k = \sqrt{1 / (1.44 \tan^2 \varphi_k + 1)}$$

by jointly solving the ellipse equation and the ray equation:

$$\begin{cases} \dfrac{u_k^2}{1} + \dfrac{v_k^2}{1.2^2} = 1 \\ u_k = v_k \tan(\varphi_k) \end{cases} \qquad (32)$$

Transforming the local (u, v) coordinate back to the image coordinate, the following observation is obtained:

$$y_t = h(x_t, n_t) \qquad (33)$$
$$= [(u_k + r_t, v_k + s_t)] + n_t, k = 1, 2, \ldots, K.$$

where $n_t$ is the measurement noise, obeying a Gaussian distribution of N(0, R). It should be noted that the observation model is highly non-linear.

The likelihood model $p(y_t|x_t)$ is determined as follows. The edge intensity is used to model the state likelihood. Along each of the K rays, the well-known Canny edge detector is used to calculate the edge intensity. The resulting function is a multi-peak function, just like the GCCF in the likelihood model for audible data. The multiple peaks signify there are multiple edge candidates along this ray. Let the number of peaks be J, we can use the same likelihood model developed in the likelihood model for audible data to model the edge likelihood along ray k:

$$p^{(k)}(y_t|x_t) = \pi_{k0} p^{(k)}(y_t|H_0) + \sum_{j=1}^{J} \pi_{kj} p^{(k)}(y_t|H_j)$$
$$= \pi_{k0} U + N_m \sum_{j=1}^{J} \pi_{kj} N((u_k, v_k)_j, \sigma_{kj})$$

The overall likelihood considering all the K rays is therefore:

$$p(y_t|x_t) = \prod_{k=1}^{K} p^{(k)}(y_t|x_t) \qquad (34)$$

The innovation model $y_t - \bar{y}_{t|t-1}$ is determined as follows. The same as the likelihood model, the innovation model also needs to take into account the multi-peak fact:

$$y_t^{(k)} - \bar{y}_{t|t-1}^{(k)} = \sum_{j=1}^{J} \pi_{kj} ((u_k, v_k)_{t,j} - (u_k, v_k)_{t|t-1})$$

where $k=1, 2, \ldots, K$, $\pi_{kj}$ is the mixing weight for the $j^{th}$ peak along ray k, and can be obtained from the corresponding edge intensity.

General Computer Environment

Figure 17:
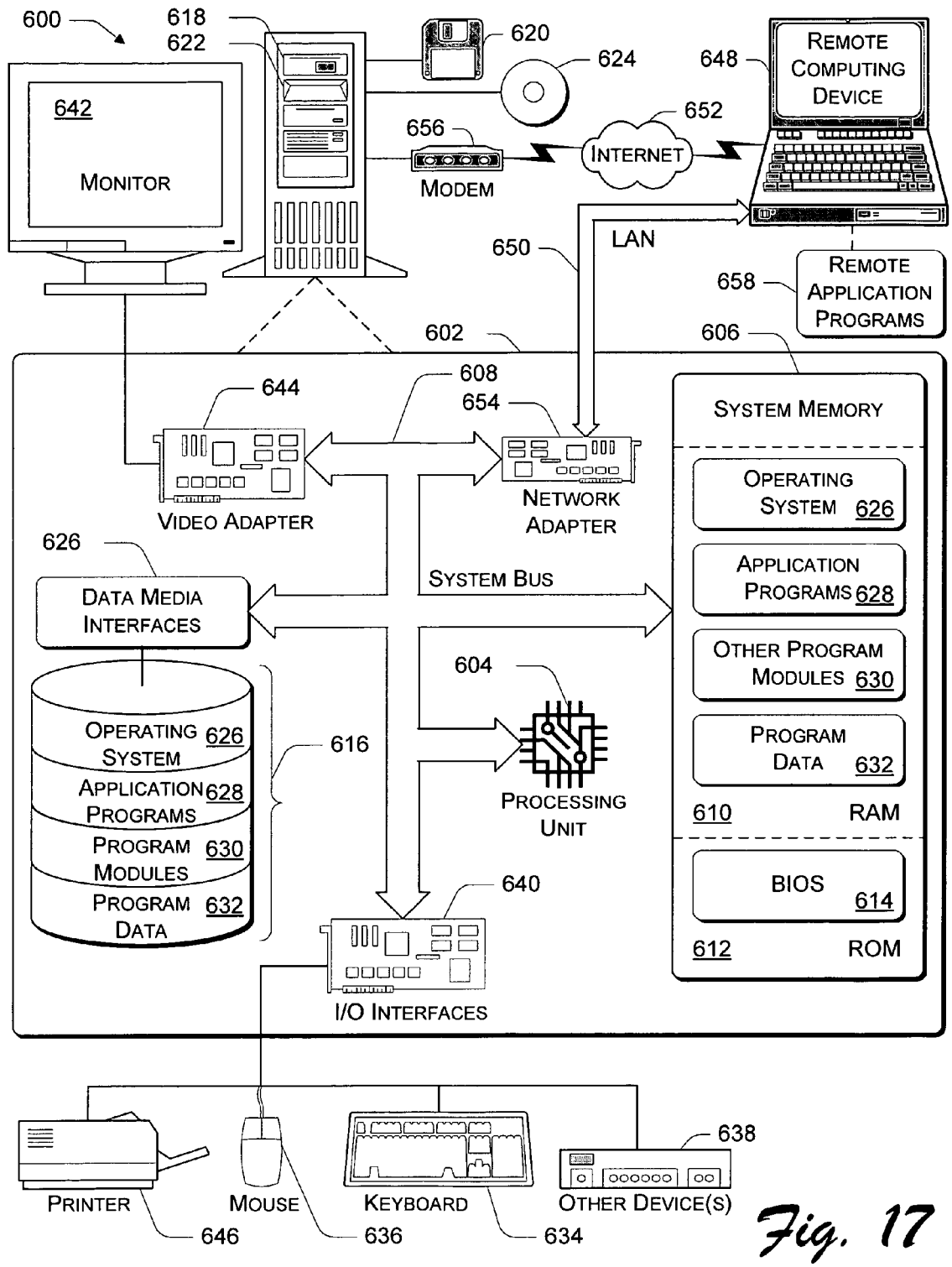
FIG. 17 illustrates an exemplary general computer environment.

FIG. 17 illustrates a general computer environment 600, which can be used to implement the automatic detection and tracking of multiple individuals described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. Computer 602 can be, for example, a system 102 of FIG. 1, a system 112 of FIG. 2, a system 130 of FIG. 3, etc. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 17 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

An implementation of the distributed file system 150 may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of the file format for the encrypted files may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although discussed herein primarily with reference to human faces, other objects can be automatically detected and/or tracked analogous to the human faces discussed herein.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable media having stored thereon a plurality of instructions to detect a candidate region for an untracked face in a frame of content, wherein the plurality of instructions, when executed by one or more processors, causes the one or more processors to:
   detect whether there is motion in the frame;
   if there is motion in the frame, then perform motion-based initialization to identify the candidate region;
   detect whether there is audio in the frame;
   if there is audio in the frame, then perform audio-based initialization to identify the candidate region; and
   if there is neither motion in the frame nor audio in the frame, then use a fast face detector to identify the candidate region;
   and wherein the plurality of instructions to perform motion-based initialization comprises instructions that cause the one or more processors to:
   determine whether there is motion at a plurality of pixels on a plurality of lines across the frame;
   generate a sum of frame differences for a plurality of segments of multiple ones of the plurality of lines;
   select, for each of the multiple lines, the segment having the largest sum;
   identify a smoothest region of the selected segments;
   check whether the smoothest region resembles a human upper body; and
   extract, as the candidate area, the portion of the smoothest region that resembles a human head.

2. One or more computer readable media as recited in claim 1, wherein the instructions to determine whether there is motion comprise instructions that cause the one or more processors to:
   determine, for each of the plurality of pixels, whether a difference between an intensity value of the pixel in the frame and an intensity value of a corresponding pixel in one or more other frames exceeds a threshold value.

3. A method to detect a candidate region for an untracked face in a frame of content, the method comprising:
   detecting whether there is motion in the frame;
   if there is motion in the frame, then performing motion-based initialization to identify the candidate region;
   detecting whether there is audio in the frame;
   if there is audio in the frame, then performing audio-based initialization to identify the candidate region; and
   if there is neither motion in the frame nor audio in the frame, then using a fast face detector to identify the candidate region;
   and wherein the performing of the motion-based initialization comprises:
   determining whether there is motion at a plurality of pixels on a plurality of lines across the frame;
   generating a sum of frame differences for a plurality of segments of multiple ones of the plurality of lines;
   selecting, for each of the multiple lines, the segment having the largest sum;
   identifying a smoothest region of the selected segments;
   checking whether the smoothest region resembles a human upper body; and
   extracting, as the candidate area, the portion of the smoothest region that resembles a human head.

4. A method as recited in claim 3, wherein the determining whether there is motion comprises:
   determining, for each of the plurality of pixels, whether a difference between an intensity value of the pixel in the frame and an intensity value of a corresponding pixel in one or more other frames exceeds a threshold value.

5. A system comprising:
   one or more processors; and
   one or more computer readable media having stored thereon a plurality of instructions to detect a candidate region for an untracked face in a frame of content, wherein the plurality of instructions, when executed by the one or more processors, causes the one or more processors to:
   detect whether there is motion in the frame;
   if there is motion in the frame, then perform motion-based initialization to identify the candidate region;
   detect whether there is audio in the frame;
   if there is audio in the frame, then perform audio-based initialization to identify the candidate region; and
   if there is neither motion in the frame nor audio in the frame, then use a fast face detector to identify the candidate region;
   and wherein the plurality of instructions to perform motion-based initialization comprises instructions that cause the one or more processors to:
   determine whether there is motion at a plurality of pixels on a plurality of lines across the frame;
   generate a sum of frame differences for a plurality of segments of multiple ones of the plurality of lines;
   select, for each of the multiple lines, the segment having the largest sum;
   identify a smoothest region of the selected segments;
   check whether the smoothest region resembles a human upper body; and
   extract, as the candidate area, the portion of the smoothest region that resembles a human head.

6. A system as recited in claim 5, wherein the instructions to determine whether there is motion comprise instructions that cause the one or more processors to:
   determine, for each of the plurality of pixels, whether a difference between an intensity value of the pixel in the frame and an intensity value of a corresponding pixel in one or more other frames exceeds a threshold value.

* * * * *